(12) United States Patent
Kurokawa et al.

(10) Patent No.: US 7,749,582 B2
(45) Date of Patent: Jul. 6, 2010

(54) SURFACE-TREATED METALLIC MATERIAL, METHOD OF SURFACE TREATING THEREFOR AND RESIN COATED METALLIC MATERIAL, METAL CAN AND CAN LID

(75) Inventors: Wataru Kurokawa, Yokohama (JP); Mitsuhide Aihara, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 46 days.

(21) Appl. No.: 10/505,548

(22) PCT Filed: Nov. 25, 2003

(86) PCT No.: PCT/JP03/15002

§ 371 (c)(1),
(2), (4) Date: Aug. 23, 2004

(87) PCT Pub. No.: WO2004/053195

PCT Pub. Date: Jun. 24, 2004

(65) Prior Publication Data

US 2005/0175798 A1 Aug. 11, 2005

(30) Foreign Application Priority Data

Nov. 25, 2002 (JP) ............................. 2002-340293
Aug. 22, 2003 (JP) ............................. 2003-208492

(51) Int. Cl.
*B29D 22/00* (2006.01)
*B32B 15/00* (2006.01)
*B32B 15/04* (2006.01)
*C25D 3/00* (2006.01)

(52) U.S. Cl. ................ 428/34.1; 106/14.05; 106/14.44; 205/80; 205/261; 428/21; 428/349

(58) Field of Classification Search ................ 428/34.1, 428/21, 349; 148/6.15; 220/75; 106/14.05, 106/14.44; 205/80, 261
See application file for complete search history.

(56) References Cited

U.S. PATENT DOCUMENTS 4,339,310 A 7/1982 Oda et al.

(Continued)

FOREIGN PATENT DOCUMENTS

| DE | 4317217 A1 | 12/1994 |
| EP | 1 405 933 A1 | 4/2004 |
| JP | 50-150647 A | 12/1975 |

(Continued)

OTHER PUBLICATIONS

International Search Report for PCT/JP2003/015002 dated Mar. 16, 2004.

*Primary Examiner*—Brent T O'Hern
(74) *Attorney, Agent, or Firm*—Sughrue Mion, PLLC

(57) ABSTRACT

A surface-treated metal material is obtained by forming an inorganic surface-treating layer containing at least Zr, O and F as chief components but without containing phosphoric acid ions on the surfaces of a metal by the cathodic electrolysis or by forming an inorganic surface-treating layer containing at least Zr, O and F as chief components and having an atomic ratio of P and Zr of $0 \leq P/Zr < 0.6$ in the uppermost surface on the surfaces of the metal by the cathodic electrolysis at a low cost featuring high productivity, environmental friendliness, scar resistance, adhesion, workability and intimate fitting. By using a metal material obtained by coating the surface-treated metal material with an organic resin and, particularly, with a polyester resin, a metal can or a can lid exhibits excellent adhesion and corrosion resistance even at portions that are worked to a high degree. Further, the can lid exhibits excellent opening performance even after the sterilization by heating.

7 Claims, 13 Drawing Sheets

U.S. PATENT DOCUMENTS

| | | | |
|---|---|---|---|
| 4,370,177 A | | 1/1983 | Frelin et al. |
| 4,470,853 A | * | 9/1984 | Das et al. .................... 148/247 |
| 4,968,391 A | * | 11/1990 | Saito et al. .................. 205/155 |
| 5,093,671 A | * | 3/1992 | Morotomi et al. ........... 347/119 |
| 5,380,374 A | | 1/1995 | Tomlinson |
| 5,584,946 A | | 12/1996 | Karmaschek et al. |
| 5,705,240 A | * | 1/1998 | Machii et al. .............. 428/35.9 |
| 5,759,244 A | * | 6/1998 | Tomlinson ............... 106/14.14 |
| 5,964,928 A | * | 10/1999 | Tomlinson ............... 106/14.21 |
| 6,037,289 A | * | 3/2000 | Chopin et al. ................... 502/2 |
| 6,419,731 B2 | * | 7/2002 | Inbe et al. ................ 106/14.44 |
| 7,531,051 B2 | | 5/2009 | Nakayama et al. |
| 2004/0244874 A1 | | 12/2004 | Nakayama et al. |

FOREIGN PATENT DOCUMENTS

| | | |
|---|---|---|
| JP | 63-100194 A | 5/1988 |
| JP | 8-74066 A | 3/1996 |
| JP | 10-018083 A | 1/1998 |
| JP | 2002-363768 A | 12/2002 |
| JP | 2003-013284 A | 1/2003 |
| JP | 2003-193292 A | 7/2003 |
| JP | 2004-018960 A | 1/2004 |
| WO | 02/103080 A1 | 12/2002 |

* cited by examiner

SURFACE-TREATED METALLIC MATERIAL, METHOD OF SURFACE TREATING THEREFOR AND RESIN COATED METALLIC MATERIAL, METAL CAN AND CAN LID

TECHNICAL FIELD

The present invention relates to a surface-treated metal material and a method of treating the surfaces thereof. More specifically, the invention relates to a surface-treated metal material free of chromium, which is environmentally friendly exhibiting excellent adhesion to an organic resin film, intimate fitting, corrosion resistance, dent resistance and abrasion resistance, to a method of treating the surfaces of the above surface-treated metal material, to a resin-coated metal material obtained by coating the above surface-treated metal material with a resin, and to metal cans and can lids made of the above material.

BACKGROUND ART

There have heretofore been known a chromate treatment, a phosphate treatment, a treatment using a silane coupling agent, an anodic oxidation treatment and the like treatment for improving the adhesion between an organic film and metal materials such as a steel plate, a zinc-plated steel plate, an aluminum-plated steel plate, a zinc alloy plate, a tin-plated steel plate, an aluminum foil, an aluminum alloy plate and a magnesium alloy plate, and for joining a metal material with a metal material of the same kind or of a different kind by using an adhesive.

The metal materials obtained through the above treatment have been widely used for such applications as domestic electric appliances, building materials, vehicles, aircraft, containers and the like. Among them, the chromate treatment has been used most widely owing to its excellent corrosion resistance and intimate adhesion.

From the standpoint of the treatment methods, the chromate treatments can be roughly divided into those of the chemical type (reaction type/coated type) and those of the electrolytic type. From the standpoint of the formed films, the chromate treatments can be roughly divided into those of the type in which a trace amount of hexavalent chromium remains in the final products for utilizing the self-restoring effect to a large extent and those of the type in which the hexavalent chromium does not remain in the final products.

As for those of the type in which a trace amount of the hexavalent chromium remains in the final products, it has been pointed out that the chromium is probable to elute out into the environment such as soil after the disposal. Therefore, it is a trend to abandon the use of the chromate treatment chiefly in European countries. Besides, the chromate treatment of either type uses a treatment solution which contains the hexavalent chromium which is a harmful substance and is, hence, accompanied by various problems from the standpoint of environment. Namely, it is important to completely treat the drain water of the hexavalent chromium-containing treatment solution and exhaust gas thereof, so that they will not be discharged to the outer side. Therefore, a tremendous amount of cost is required for the facilities for treating the drain water and exhaust gas, and for the disposal treatment. Besides, the rules are becoming stringent for moving the sludge after the drain water is treated and for treating the exhaust gases. Therefore, it has been desired to develop a non-chromium surface treatment that is comparable to the conventional chromate treatment.

Metal materials for metal containers have now been subjected to the chromate treatment of the type in which the hexavalent chromium does not remain in the final products and, besides, the surfaces thereof have been coated with an organic resin. For example, the tin-plated steel plate is subjected to the cathodic electrolysis in an aqueous solution of a sodium bichromate, the steel plate is subjected to the cathodic electrolysis in an aqueous solution of fluoride-containing chromium anhydride, and an aluminum alloy is subjected to the chromium phosphate treatment followed by the coating with an organic resin.

As the non-chromium surface treatment, a chemical film containing chiefly oxides of zirconium and/titanium has been formed on the surfaces of an aluminum-containing metal material by using an acidic treatment solution that contains zirconium, titanium, a compound thereof, phosphate and fluoride and that has a pH of about 1.0 to 4.0. Depending upon the compatibility with the organic resin, further, there have been put into practical use those materials without the chemical film at all (see, for example, Japanese Unexamined Patent Publication (Kokai) No. 131937/1977).

In recent years, from the standpoint of sanitation of the metal containers and retaining flavor of the contents, there has been widely used a pre-coated material coated with a polyester resin. However, the polyester resin permits water to permeate through more than when the traditional epoxyphenol coating material or the acrylic epoxy coating material is used. When the polyester resin is pre-coated, therefore, limitation is imposed on the contents from the standpoint of adhesion and corrosion resistance unless the chromate treatment is used. Further, when aluminum coated with the polyester resin is used as an aluminum lid, there remains a problem of insufficient adhesion despite the chromate treatment is effected.

That is, a can coated with the polyester resin, which is an example of a product obtained by working a pre-coated material, offers an advantage in that the pre-coated metal material can be used as a starting material. However, the above can is accompanied by such problems as drop of adhesion of the polyester resin at the highly worked portions, corrosion starting with the cracked portions in the polyester resin caused by shocks such as of when the can has fallen down, drop of adhesion during the retort sterilization, induction of corrosion due to ions penetrated from the components of the content despite the polyester film itself is flawless, which are different from the problems of the conventional production method of effecting the surface treatment and the post-coating after the can has been formed.

On the other hand, the can lids have heretofore been using a pre-coated material for forming the coating material as a coil coating. From the standpoint of retaining flavor of the content and sanitation, however, study has been vigorously forwarded by utilizing a pre-coated material coated with the polyester resin. In an easy-open lid coated with the polyester resin, the delamination in which the resin peels off the metal easily occurs near the score opening due to a decrease in the adhesion to the polyester resin, causing the resin to be drawn at the opening, i.e., causing a feathering phenomenon to easily take place. In the can lid immediately after the retort sterilization, in particular, the opening tends to become defective decreasing the adhesion to the resin.

From the above point of view, there have been proposed a method of forming an organic/inorganic composite film containing an organic compound comprising chiefly carbon, and a phosphorus compound, and a zirconium compound or a titanium compound (Japanese Unexamined Patent Publication (Kokai) No. 11-229156), and a method of forming a surface-treating layer comprising chiefly an inorganic material on the surface of an aluminum base material and further forming thereon an organic surface-treating layer comprising chiefly an aqueous phenol resin (Japanese Unexamined Patent Publication (Kokai) No. 2001-121648). From the standpoint of the lid material, further, there has been proposed the anodic oxidation processing (see Japanese Unexamined Patent Publications (Kokai) No. 11-91034 and 2002-266099).

There has further been proposed the treatment of aluminum material with a polyacrylic acid/zirconium compound (Japanese Unexamined Patent Publication (Kokai) No. 6-322552 and "Light Metals", 1990, pp. 298-304).

In order to form a zirconium oxide film, further, attempts have been made to form $ZrO_2$ relying upon the PVD or the CVD, or to form an oxide film by applying an organic zirconium compound relying upon the wet method followed by hot drying.

Moreover, study has been conducted to form a zirconium oxide powder or a film on a graphite or titanium substrate by the cathodic electrolysis in an aqueous solution containing zirconium ions ("Materials Research Society Symposium Proceedings", 1988, Vol. 121, pp. 111-114 and "Journal of Electrochemical Society", 1991, Vol. 138, No. 7, pp. 1939-1942).

DISCLOSURE OF THE INVENTION

With the method of forming an organic/inorganic composite film containing an organic compound comprising chiefly carbon, and a phosphorus compound, and a zirconium compound or a titanium compound, however, the adhesion improves to some extent but the corrosion resistance is not sufficient. With the method of forming a surface-treating layer comprising chiefly an inorganic material on the surface of an aluminum base material and further forming thereon an organic surface-treating layer comprising chiefly an aqueous phenol resin, on the other hand, both the adhesion and the corrosion resistance are improved to some extent resulting, however, in an increase in the number of steps and complicating the treatment of waste liquor after the chemical solutions are used.

According to the method of utilizing the anodic oxidation treatment, the primary adhesion is preferable. However, the adhesion decreases due to the retort sterilization treatment after the content has been filled and, besides, the treatment facility requires a cost. Further, a large amount of electric power is necessary for the treatment driving up the cost.

Further, when the thickness of the base material itself is small like that of an aluminum foil, the base material dissolves during the anodic oxidation treatment, and the anodically oxidized film that can be poorly worked occupies an increased proportion, lowering the flexibility of the foil.

In the treatment of an aluminum material with the polyacrylic acid/zirconium compound, the film that is formed is an organic/inorganic composite film, and the treatment method basically relies upon the coating, leaving a problem with regard to wettability and adhesion to the metallic base material during the high-speed treatment.

In many of the above prior art, however, the metal material that is used is limited to an aluminum alloy without solving the problem of the metallic materials as a whole.

It has been known to form $ZrO_2$ on the surface of the metal material relying upon the PVD or the CVD requiring, however, vacuum using expensive facilities, making it difficult to conduct the treatment at high speeds and, as a result, driving up the cost. It is further difficult to maintain adhesion between the metallic base material and the treating film or to maintain corrosion resistance after the working.

Similarly, even in the method of obtaining an oxide film by applying an organic zirconium compound by the wet method followed by heat-drying, it is difficult to maintain the adhesion between the metallic base material and the treating film or to maintain the corrosion resistance after the working.

There has further been proposed a method of continuously effecting the cathodic electrolysis on a graphite or titanium substrate in an aqueous solution of 0.1 mol/liter of zirconium oxynitrate having a pH of 2.3 as means for forming an oxide powder or an oxide film by the cathodic electrolysis in an aqueous solution containing zirconium ions. However, this method is accompanied by problems such as the pH of the solution is too low when it is used for an aluminum plate, for a zinc-plated steel plate or for a tin-plated steel plate causing the base material to be dissolved, the bath concentration is too high causing local precipitation, and the gel-like film precipitates electrolytically and the film after the electrolysis is easily peeled off during the washing with water and, besides, the gel-like material peels and falls in the bath when the treating solution is flowing making it difficult to continuously treat the belt-like metallic material at high speeds by stirring the bath. Further, if rubbed by a finger immediately after the electrolysis, the precipitate is mostly peeled off and is weakly adhered to the base material. Even from the standpoint of properties, it is difficult to maintain the surface state under a high temperature and highly humid environment, leaving problems in the properties such as corrosion resistance and adhesion.

It is therefore an object of the present invention to provide a surface-treated metal material which is environmentally friendly owing to its non-chromium surface treatment and which exhibits excellent properties such as adhesion to the organic resin film, adhesive property, corrosion resistance, dent resistance, scar resistance and abrasion resistance, as well as a method of treating the surfaces of the above surface-treated metal material.

Another object of the present invention is to provide a surface-treating method facilitating the production owing to a high-speed treatment from an aqueous solution and at a low cost.

A further object of the present invention is to provide metal cans and can lids that can be excellently opened, being made of a resin-coated metal material obtained by coating the above surface-treated metal material with an organic resin and, particularly, with a polyester resin, featuring excellent corrosion resistance, dent resistance, scar resistance and abrasion resistance.

According to the present invention, there is provided a surface-treated metal material having a surface-treating layer comprising chiefly an inorganic component formed on the surfaces of a metal material, said inorganic surface-treating layer comprising at least Zr, O and F as chief components, but without containing phosphoric acid ions.

According to the present invention, there is further provided a surface-treated metal material having a surface-treating layer comprising chiefly an inorganic component formed on the surfaces of a metal material, said inorganic surface-treating layer comprising at least Zr, O and F as chief components, and the atomic ratio of P and Zr contained in the uppermost surface of the inorganic surface-treating layer being $0 \leq P/Zr < 0.6$.

In the surface-treated metal material of the present invention, it is desired that:

1. The atomic ratio of O and Zr contained in the uppermost surface of the inorganic surface-treating layer is $1 < O/Zr < 10$;

2. The atomic ratio of F and Zr contained in the uppermost surface of the inorganic surface-treating layer is $0.1<F/Zr<2.5$;

3. The thickness of the inorganic surface-treating layer is 5 to 300 mg/m$^2$ as gravimetric film thickness of Zr; and 4. Fine particles containing Zr of 10 to 100 nm are present in at least a portion in the surface.

According to the present invention, further, there is provided a resin-coated metal material obtained by coating at least one surface of the surface-treated metal material with an organic resin and, particularly, a polyester resin, as well as metal cans and can lids made of the above resin-coated metal material.

According to the present invention, there is further provided a method of treating the surfaces of a metal plate by forming an inorganic film on the surfaces of the metal plate by the cathodic electrolytic treatment in an aqueous solution containing Zr and F and having a phosphoric acid ion concentration of smaller than 0.003 mols/liter calculated as PO$_4$.

In the above method of treating the surfaces of the metal material, it is desired that the cathodic electrolytic treatment is intermittently conducted, that the aqueous solution contains Zr at a concentration in a range of 0.010 to 0.050 mols/liter, and contains F at a concentration in a range of 0.03 to 0.35 mols/liter.

According to the present invention an inorganic surface-treating layer containing at least Zr, O and F as chief components but without containing phosphoric acid ions is formed on the surfaces of the metal by the cathodic electrolysis, or an inorganic surface-treating layer containing at least Zr, O and F as chief components and having an atomic ratio of P and Zr of $0 \leq P/Zr < 0.6$ in the uppermost surface, is formed on the surfaces of the metal by the cathodic electrolysis in order to provide, at a low cost, the surface-treated metal material featuring high productivity, environmental friendliness, scar resistance, adhesion, workability and intimate fitting. By forming a metal can by using a metal material obtained by coating the surface-treated metal material with an organic resin and, particularly, a polyester resin, it is allowed to obtain excellent adhesion and corrosion resistance even at portions that are worked to a high degree. Further, by forming a can closure by using a metal material obtained by coating the surface-treated metal material with an organic resin and, particularly, a polyester resin, it is made possible to obtain excellent opening performance even after the sterilization by heating.

The surface-treated metal material and the resin-coated metal material of the present invention can be effectively used particularly for the metal cans and the can lids, as well as for automobiles, domestic electric appliances and building materials.

BEST MODE FOR CARRYING OUT THE INVENTION

Figure 1:
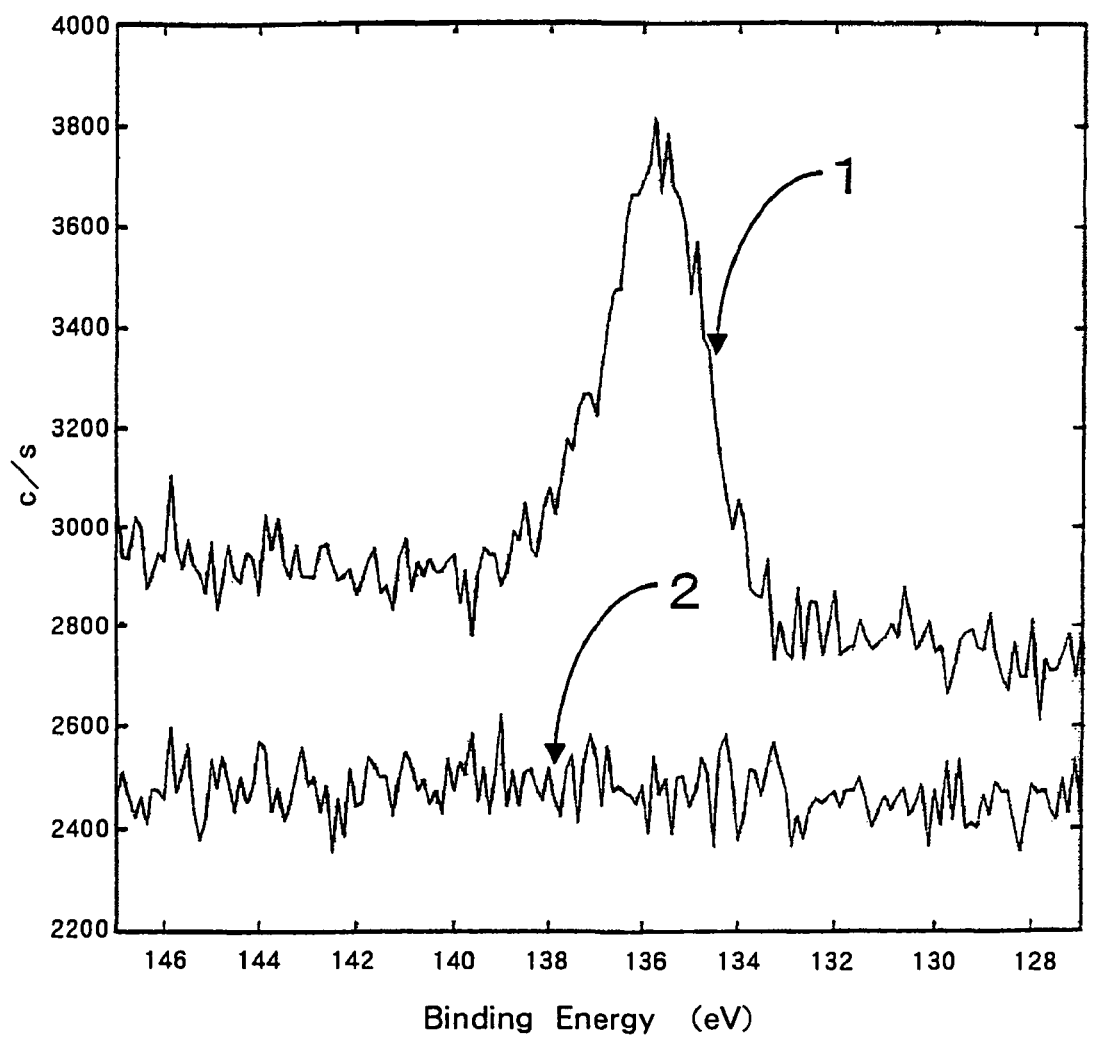
FIG. 1 is a diagram measuring peaks P2$p$ of a surface-treated metal material of the present invention and of a surface-treated metal material treated with the zirconium phosphate by using an XPS.

In the surface-treated metal material of the present invention, an important feature resides in that the inorganic surface-treating layer formed on the surface of the metal material contains at least Zr, O and F as chief components but does not contain phosphoric acid ions or suppresses the ratio P/Zr to be as small as possible.

In the chemical treatment and the anodic oxidation treatment which are the conventional methods of treating the surfaces of the metal materials, sulfuric acid ions and phosphoric acid ions tend to infiltrate into the films due to the structure of forming the films. In the chemical treatment, they are the constituent components. It has been known that anions in the film and, particularly, anions having a large ionic radius such as phosphoric acid ions, tend to elute out under high-temperature and humid conditions such as of retort sterilization treatment. The elution of anions from the treating film causes a drop in the intimate fitting and adhesion of the resin film on the surface-treated metal material.

In the present invention, the amount of anions in the inorganic surface-treated layer and, particularly, the phosphoric acid ions or P/Zr, are controlled to effectively suppress the elution of anions from the treating film and to effectively prevent a drop in the intimate fitting or the adhesion of the resin film even when the surface-treated metal material is subjected to the retort sterilization or is preserved for extended periods of time under high-temperature and humid conditions.

In the surface-treated metal material of the present invention, further, the inorganic surface-treating layer contains Zr, O and F as chief components. Therefore, the state of the uppermost surface of the treating layer is maintained even under high-temperature and highly humid environment to maintain stable surface making, as a result, it possible to maintain corrosion resistance and to suppress a drop in the intimate fitting or in the adhesion of the resin film.

That is, when the inorganic surface-treating layer contains Zr and O as chief components but does not contain F, it is estimated that the treating film has a structure $ZrO_x(OH)_y$.

In a high-temperature and highly humid environment, however, it is probable that the hydroxyl groups are hydrated to induce a change in the structure of the treating layer adversely affecting various properties. Upon containing a suitable amount of F, the hydroxyl groups can be at least partly substituted by F to assume a stable structure like $ZrO_X(OH)_{Y-Z}F_Z$ suppressing a change in the structure of the treating layer under the high-temperature and highly humid environment and maintaining a further stabilized surface.

In the surface-treated metal material and in the metal can or metal lid made of a resin-coated metal material that is obtained by coating the surface-treated metal material with an organic resin and, particularly, with a polyester resin, it is made possible to improve the intimate adhesion of the polyester resin film in the highly worked portions, to improve corrosion resistance (dent resistance) that start with the cracked portions in the polyester resin film caused by impact and, further, to improve intimate adhesion during the retort sterilization, suppressing corrosion due to permeating ions owing to the use of the resin-coated metal material having excellent adhesion and corrosion resistance. It is further allowed to improve the opening performance of the easy-open can lids.

In the method of treating the surface of the metal material of the present invention, an important feature resides in the cathodic electrolytic treatment in an aqueous solution which contains Zr and F, has a phosphoric acid ion concentration of smaller than 0.003 mols/liter calculated as $PO_4$ and, more preferably, without containing phosphoric acid ions.

The cathodic electrolytic treatment makes it possible to greatly expand the range of controlling the Zr gravimetric film thickness per a unit time as compared to the conventional chemically treated film and, hence, to form a film that meets the use.

The conventional chemical treatment is based on the chemical reaction of the treating solution composition, and has a limit on the rate of forming the film. In the high-speed treatment, therefore, limitation is imposed on the film thickness. The cathodic electrolytic treatment, on the other hand, utilizes the electrolytic reaction making it possible to form the film at a high speed. In the chemical treatment and in the anodic oxidation treatment, further, sulfuric acid ions and phosphoric acid ions tend to infiltrate into the film due to the mechanism of forming the film. In the chemical treatment, they are the constituent components making it difficult to control the amount of anions as described above. On the other hand, the cathodic electrolytic treatment uses an aqueous solution of a fluoride and makes it possible to form a film while controlling the amount of anions having large ionic radii such as sulfuric acid ions and phosphoric acid ions.

In the method of treating the surfaces of the metal material of the present invention, further, it is desired that the cathodic electrolytic treatment is conducted intermittently. That is, the electrolysis is not carried out continuously but a halting time is provided during the electrolysis to control the ratio O/Zr in the surface-treating layer and to heighten the efficiency of precipitation as compared to when the electrolysis is continuously conducted. As a result, the treatment is conducted maintaining a high quality and at a high speed.

(Surface-Treated Metal Material)

In the surface-treated metal material of the present invention, an important feature resides in that the inorganic surface-treating layer of the surface-treated metal material does not contain phosphoric acid as described earlier. This will become obvious from the analytical results described below.

Namely, FIG. 1 illustrates the measurement of peaks P2$p$ in the chemical treatment 1 with the zirconium phosphate which is a representative example of the surface-treating film containing phosphoric acid ions and in the inorganic surface treatment 2 containing Zr, O and F but without containing phosphoric acid ions according to the present invention by using an X-ray photoelectron spectrometer (hereinafter referred to as XPS). It is obvious from FIG. 1 that in the chemically treated surface 1, the peak P2$p$ is clearly observed since phosphoric acid is contained in the treating solution. In the inorganic surface treatment 2 according to the invention, on the other hand, no peak P2$p$ is recognized.

Figure 2:
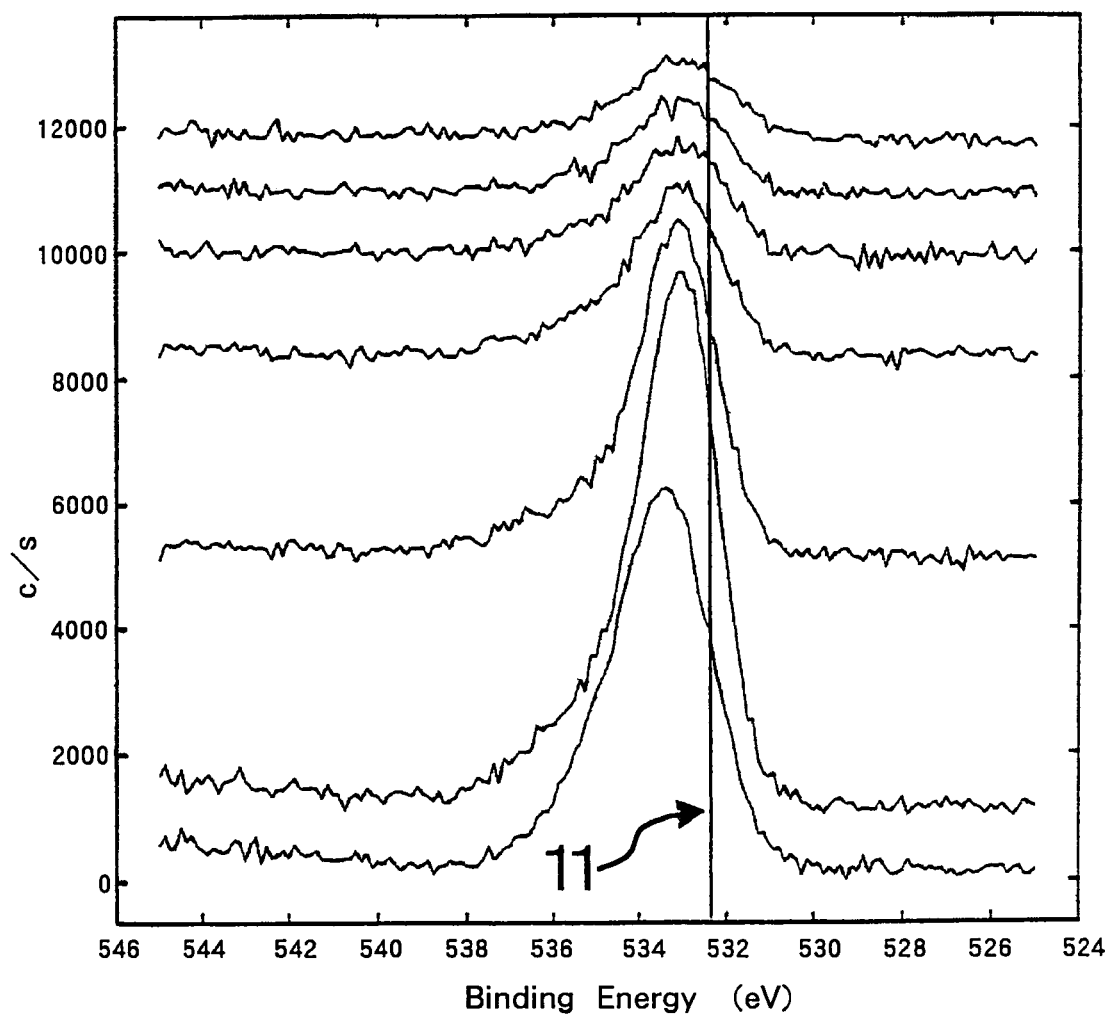
FIG. 2 is a diagram illustrating peaks O1$s$ of the surface-treated metal material treated with the zirconium phosphate as analyzed in the direction of depth also utilizing the sputtering.
Figure 3:
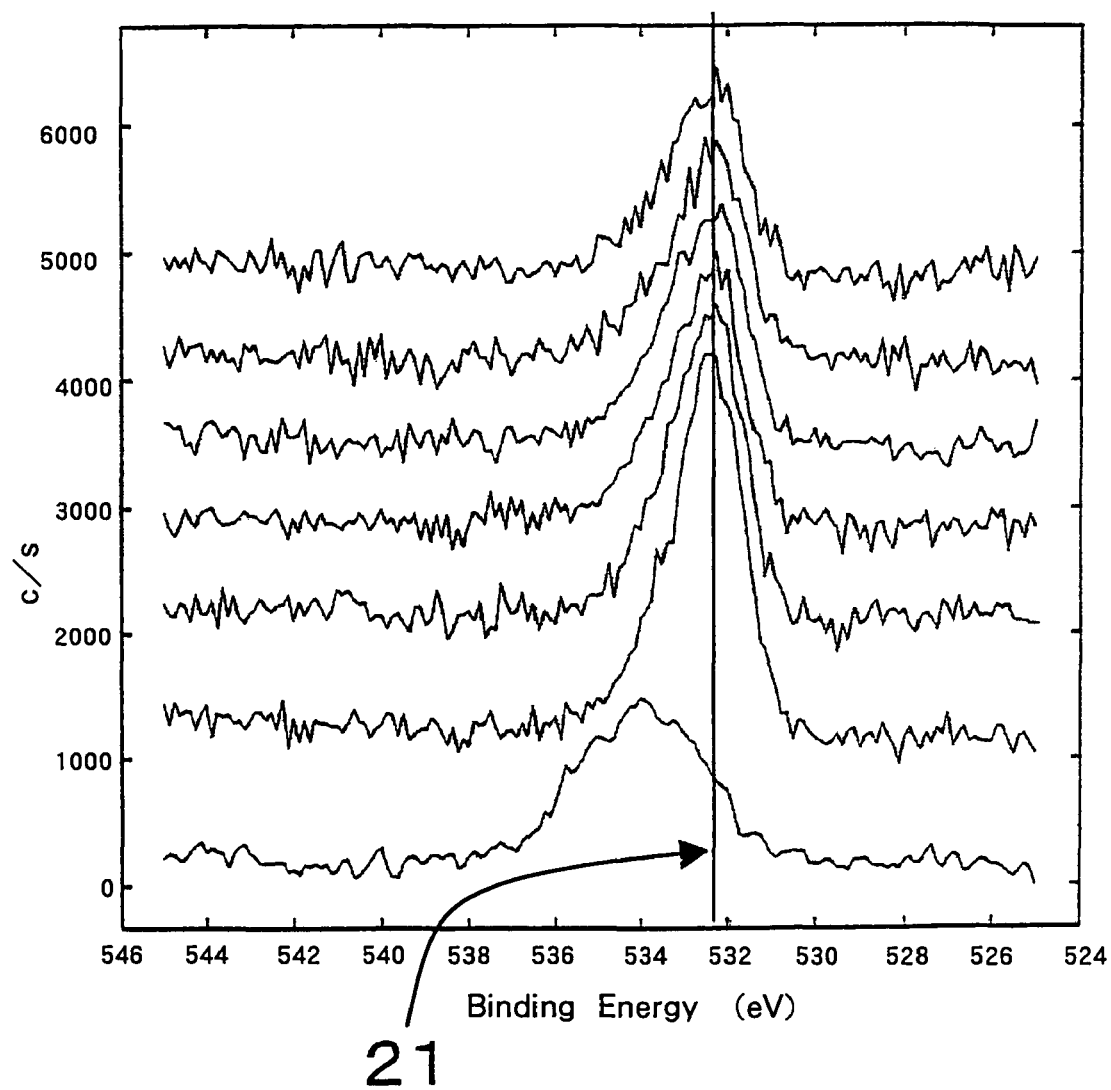
FIG. 3 is a diagram illustrating peaks O1$s$ of the surface-treated metal material of the present invention as analyzed in the direction of depth also utilizing the sputtering.

FIGS. 2 and 3 are diagrams illustrating the peaks O1$s$ of the chemical treatment 1 with the zirconium phosphate and of the inorganic surface treatment 2 of the present invention as analyzed in the direction of depth from the surface also utilizing the sputtering. In FIGS. 2 and 3, the peaks obtained from the uppermost surfaces are located at the lowest positions, and the peaks close to the metal substrates away from the surfaces are located on the upper sides. Though not judged from the energy positions due to the presence of oxygen stemming from the surface contamination on the uppermost surface in FIGS. 2 and 3, the analysis in the direction of depth indicates that the binding energy position 11 of the peak O1$s$ of the chemical treatment 1 having the peak O1$s$ stemming from the phosphoric acid ions is appearing on the side of the higher energy as compared to the binding energy position 21 of the peak O1$s$ of the inorganic surface-treating film 2 containing Zr, O and F but without containing phosphoric acid ions of the present invention. It is therefore obvious that the surface-treated metal material of the present invention contains no phosphoric acid in the surface-treating layer.

In the surface-treated metal material of the present invention, further, an important feature resides in that the atomic ratio of P and Zr contained in the uppermost surface of the inorganic surface-treating layer of the surface-treated metal material is in a range of $0 \leq P/Zr < 0.6$ and, more preferably, in a range of $0 \leq P/Zr < 0.1$. When the ratio P/Zr is larger than the above range, the film contains P in large amounts as phosphoric acid or as an impurity component making it difficult to obtain adhesion to a sufficient degree.

Further, the inorganic surface-treating layer of the surface-treated metal material of the present invention contains Zr, O and F as chief components, and it is desired that the uppermost surface layer has an atomic ratio O/Zr in a range of 1 to 10 and, particularly, in a range of 1 to 5. When the atomic ratio O/Zr is smaller than the above range, it becomes difficult to form the film. When the atomic ratio O/Zr exceeds the above range, on the other hand, the adhesion is not obtained to a sufficient degree.

In the surface-treated metal material of the present invention, further, it is desired that the atomic ratio F/Zr in the uppermost surface of the inorganic surface-treating layer of the surface-treated metal material is in a range of 0.1 to 2.5 and, particularly, in a range of 0.5 to 2.0. When the atomic ratio F/Zr is smaller than the above range, the above-mentioned stable structure like $ZrO_X(OH)_{Y-Z}F_Z$ is not obtained, and the adhesion tends to decrease in a high-temperature and highly humid environment. When the atomic ratio F/Zr is greater than the above range, too, the amount of anions becomes excessive relative to Zr though the ionic radius is small, and the adhesion decreases, too.

The peaks P2$p$, O1$s$, F1$s$ and Zr3$d$ are measured, and the atomic ratios P/Zr, O/Zr and F/Zr are found from the concentrations of atoms by using an analytical software. The surface-treated metal materials can be measured directly for their surfaces if the surfaces are in a clean state. When the organic resin is adhered or melt-adhered, however, the surface-treated metal materials must be immersed in boiling hydrogen peroxide for several minutes to remove the organic resin layer.

As for the samples which are not clean or the samples from which the organic resin film has been removed, the carbon layer stemming from an organic material is sputtered with argon until the atomic concentration of carbon becomes smaller than 10% relative to the sum of principal elements such as C, O, F, Zr and base metal element, which is regarded to be 100%. After the contamination layer is thus removed to some extent, the ratios P/Zr, O/Zr and F/Zr can then be found. After the background is removed, further, the peak areas are found for the elements P, O, F and Zr based on a predetermined method. Then, the atomic concentrations of the elements are found by using relative sensitivity coefficients of the measuring device, and the ratios P/Zr, O/Zr and F/Zr are found by calculation.

Figure 4:
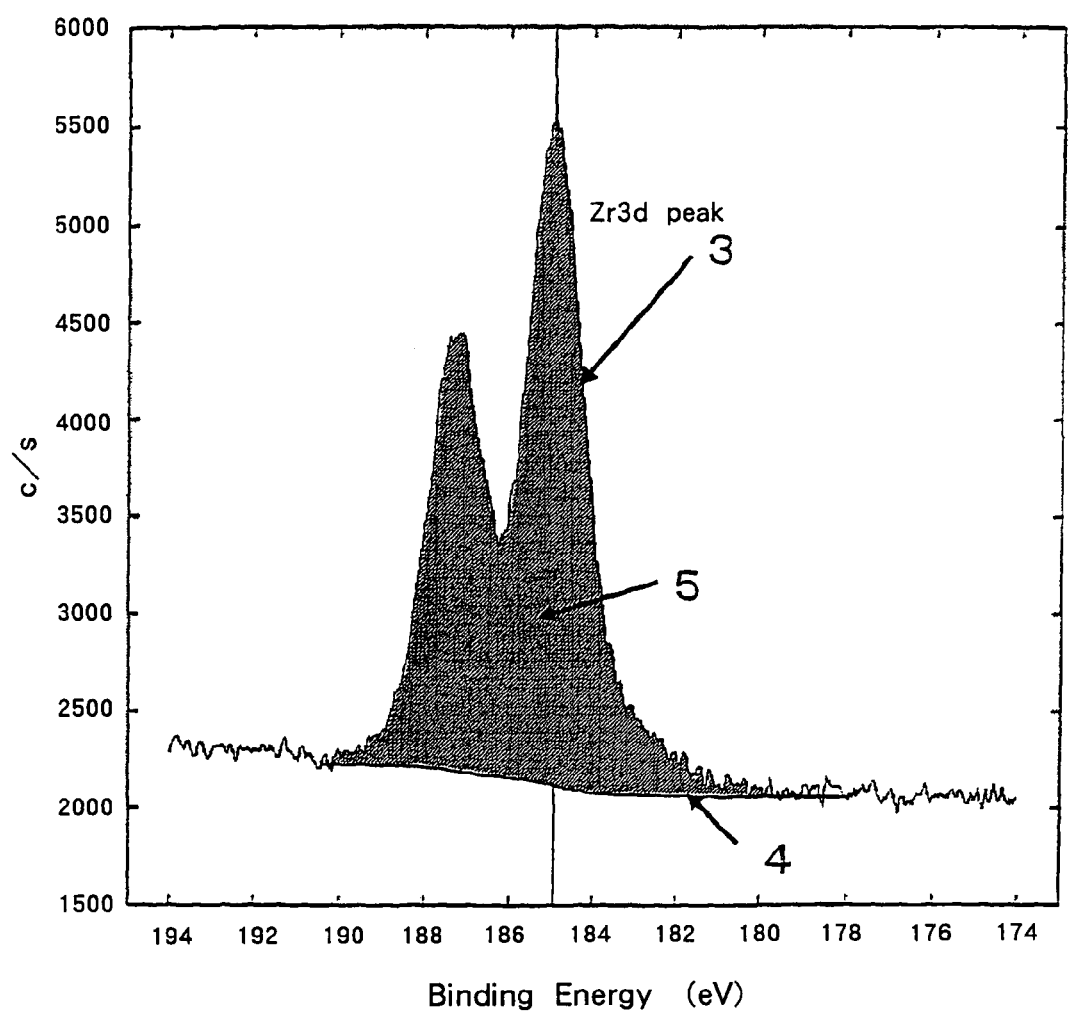
FIG. 4 is a diagram illustrating a peak Zr3$d$ of the surface-treated metal material of the present invention.

FIG. 4 shows a Zr3d peak 3. The range surrounded by a reference line 4 of background and by the peak 3 represents a peak area 5. Though this is quite natural, the atomic ratio varies depending upon the manner of drawing the background. Therefore, attention must be given to drawing the background.

The peak P2p is confusing with the plasmon loss peak of Al2s and requires attention. As the sputtering proceeds in the direction of depth, in particular, a peak considered to be P2p may monotonously increase with the peak Al2s. In such a case, the presence of the element P must be confirmed by any other method such as the characteristic X-ray analysis after the surface film has been isolated.

It is further desired that the film thickness lies in a range of 5 to 300 mg/m$^2$ in terms of the Zr gravimetric film thickness. When the film thickness is smaller than 5 mg/cm$^2$, it becomes difficult to uniformly form the film, and the coating ratio is not sufficient. When the film thickness exceeds 300 g/m$^2$, on the other hand, the adhesion decreases through the working, which is not desirable.

The Zr film thickness is measured by using a fluorescent X-ray analyzer that is placed in the market. First, a calibration curve representing a relationship between the Zr film thickness and the X-ray intensity of Zr is prepared from a plurality of samples of which the Zr gravimetric film thicknesses have been known and, then, the X-ray intensity of Zr measured by using an unknown sample is converted into a gravimetric film thickness based on the calibration curve.

In the surface-treated metal material of the invention, further, when the metal material base that is to be treated is a metal such as an aluminum alloy or an aluminum-coated steel plate that are likely to be easily scratched, fine particles of diameters of 10 to 100 nm are precipitated on the surface to cover the surface of the metal material. This may be fine oxide particles comprising chiefly Zr, and the aluminum surface can be reformed by the cathodic electrolysis without effecting any special pre-treatment to improve the scratch resistance and the abrasion resistance.

Figure 5:
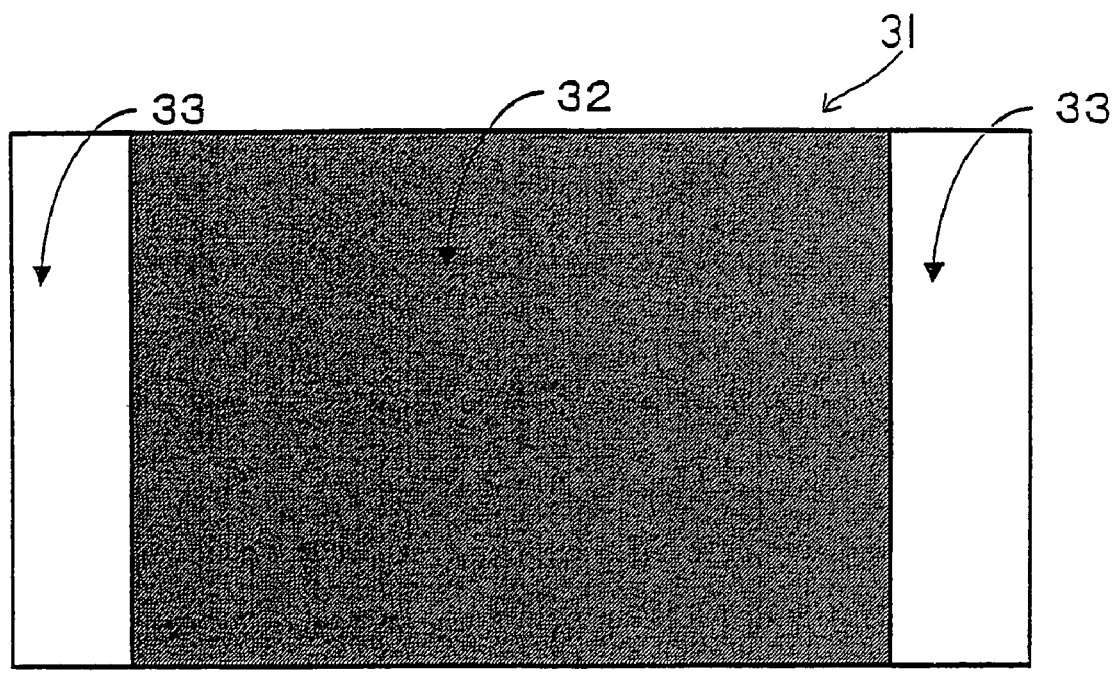
FIG. 5 is a sectional view illustrating a surface-treated metal material of the present invention.
Figure 6:
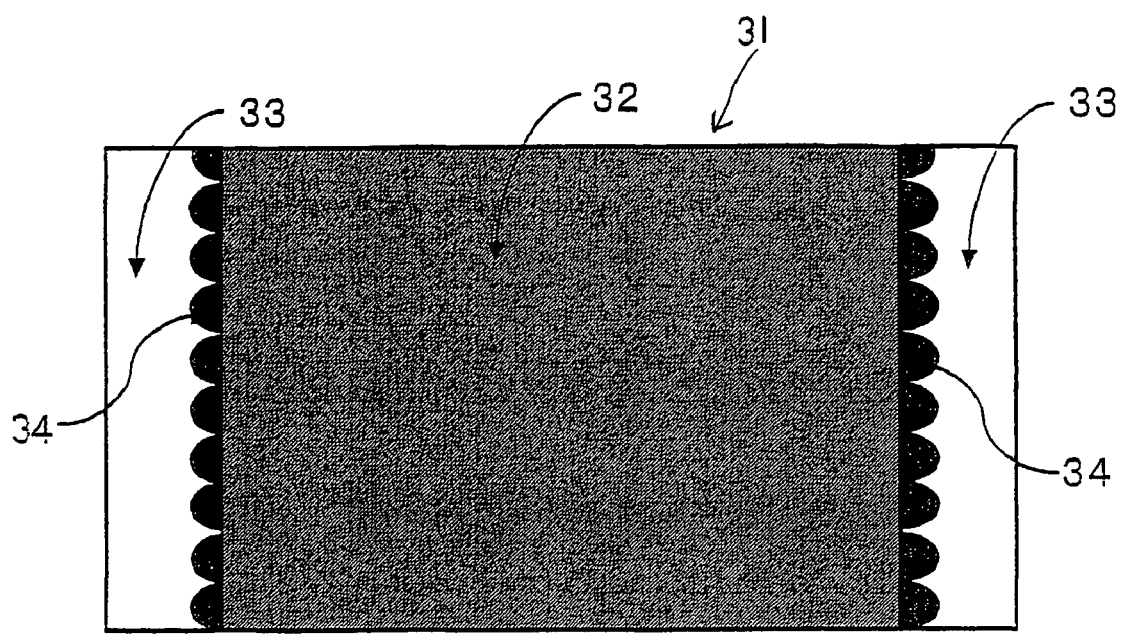
FIG. 6 is a sectional view illustrating another surface-treated metal material of the present invention.
Figure 7:
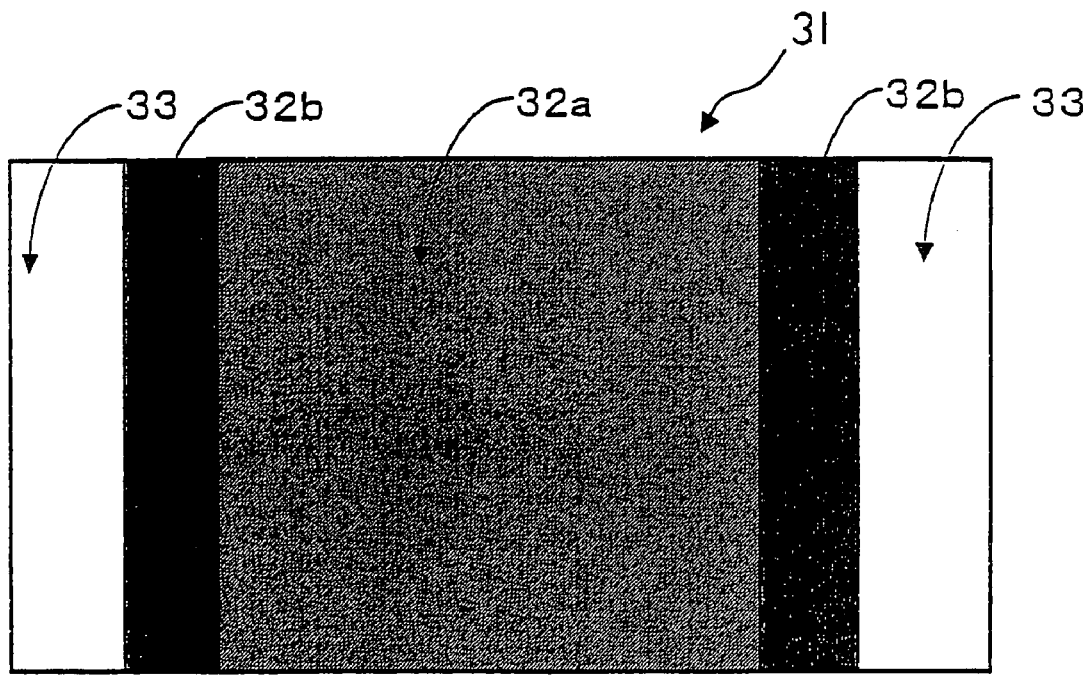
FIG. 7 is a sectional view illustrating a further surface-treated metal material of the present invention.

FIGS. 5 to 7 are sectional views illustrating examples of the surface-treated metal material of the present invention. The surface-treated metal material 31 illustrated in FIG. 5 includes a metal material base 32, and inorganic surface-treating layers 33 formed on the surfaces of the base and containing Zr, O and F as chief components. In an embodiment of FIG. 6, fine particles 34 containing zirconium of a particle diameter of 10 nm to 100 nm are existing in the inorganic surface-treating layers 33.

The surface-treated metal material 31 illustrated in FIG. 7 is the same as that of FIG. 5 with respect to possessing the inorganic surface-treating layers 33 containing Zr, O and F as chief components, but in which the metal material base 32 is constituted by a metal material 32a and metal-plated layers 32b. The metal-plated layer 32b plated on the metal material 32a occupying a large proportion of the base 32 plays the role of enhancing the corrosion resistance of the metal material 32a as will be described later.

(Metal Material Base)

As the metal material base used in the present invention, there can be used a variety of surface-treated steel plates and light metal materials such as aluminum and the like. As the surface-treated steel plate, there can be used the one obtained by annealing a cold-rolled steel plate, putting it to the secondary cold rolling and conducting one or two or more kinds of surface treatments such as zinc plating, tin plating, nickel plating and aluminum plating. There can be further used an aluminum-clad steel plate. A metal is formed by plating or cladding on the surface side of the metal material base in order to improve the corrosion resistance, abrasion resistance and electric conduction of the metal formed on the center side and, in most cases, in order to improve the corrosion resistance. As the light metal materials, there can be used so-called pure aluminum as well as an aluminum alloy. There is no particular limitation on the thickness of the metal material. Usually, however, the metal material has a thickness of 0.10 to 0.50 mm as a metal plate though it may vary depending upon the kind of the metal, use of the container and size of the container. Among them, it is desired that the thickness is 0.10 to 0.30 mm in the case of the surface-treated steel plate and 0.15 to 0.40 mm in the case of a light metal plate.

(Method of Treating the Surfaces)

In the method of treating the surfaces of the metal material of the present invention, an important feature resides in that the cathodic electrolytic treatment is conducted in an aqueous solution containing Zr and F and having a phosphoric acid ion concentration of smaller than 0.003 mols/liter as $PO_4$ and, more preferably, without containing phosphoric acid.

As described earlier, the cathodic electrolytic treatment makes it possible to greatly increase the range of controlling the Zr gravimetric film thickness per a unit time as compared to the conventional chemically treated films, and to form the film that meets the use.

Figure 8:
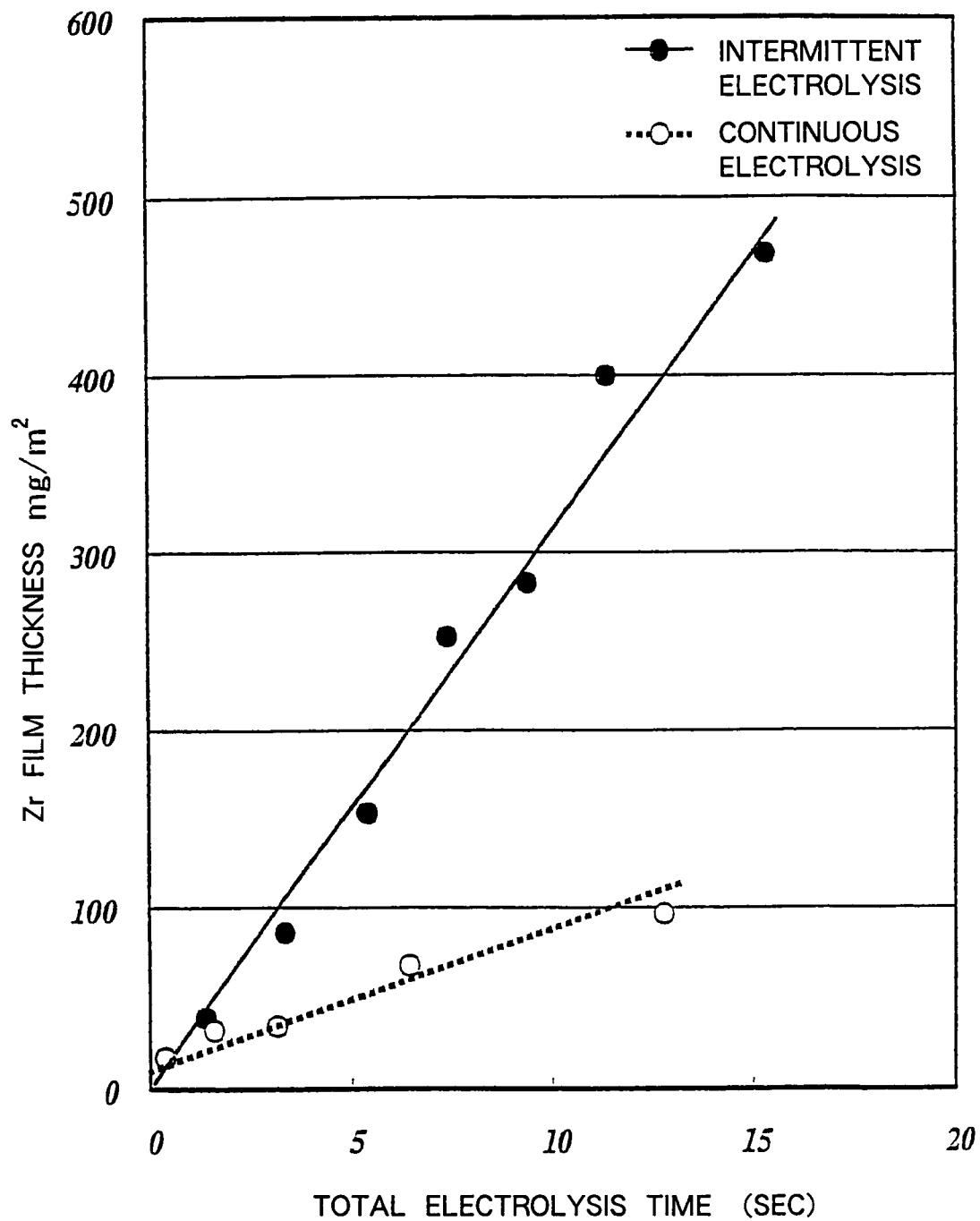
FIG. 8 is a diagram illustrating a relationship between the total electrolysis time and the gravimetric thickness of a Zr film.

In the method of treating the surfaces of the invention, further, it is desired to intermittently conduct the cathodic electrolytic treatment, i.e., to intermittently conduct the electrolysis by providing a halting time during the electrolysis to repeat the cycle of flowing a current in the aqueous solution that is being stirred and interrupting the current a plural number of times. FIG. 8 is a diagram illustrating a relationship between the Zr gravimetric film thickness and the total electrolyzing time which is the sum of the current-flowing time and the interrupting time. It will be obvious from FIG. 8 that the Zr gravimetric film thickness is formed quicker when the cathodic electrolysis is intermittently conducted than when the cathodic electrolysis is continuously conducted.

This is because, when the electrolysis is continuously conducted, a concentration polarization takes place near the cathode to impair the precipitation. When the electrolysis is intermittently conducted, however, ions such as of Zr, O, OH and F are fed to near the cathode due to the stirring effect while the electrolysis is interrupted. Besides, loose film formed on the cathode is removed, i.e., the film having a large ratio O/Zr is removed. As a result, the Zr gravimetric film is formed at an increased rate and there is provided a film of a high quality.

The cycle of flowing the current and interrupting the current is not limited to the above example only. It is, however, desired that the cycle is conducted 2 to 10 times maintaining a current flowing time of 0.1 to 0.8 seconds and an interrupting time of 0.3 to 1.5 seconds.

It is desired that the aqueous solution used for the method of treating the surfaces of the invention has a bath concentration calculated as Zr of 0.010 to 0.050 mols/liter and, particularly, 0.015 to 0.035 mols/liter. In the cathodic electrolytic treatment, the electrolysis locally concentrates on the metal plate if a dense oxide film has been formed on the surface, making it difficult to form a uniform film. Therefore, a special pre-treatment is required in many cases. In the present invention, however, the electrolytic treatment is conducted in a bath of a low concentration to form a surface-treating film as uniformly as possible without effecting a special pre-treatment. That is, if the bath concentration is higher than the above range, nuclei are locally formed and electrolysis preferentially concentrates on such portions eventually forming a non-uniform film. When the bath concentration is lower than the above range, on the other hand, the electric conduction of the bath becomes low and an increased amount of electric power is required for the treatment, which is not desirable.

It is desired that the aqueous solution used for treating the surfaces has a pH of 3.0 to 8.0 and, more preferably, a pH of 3.5 to 6.5. As the Zr agent used for the treating solution, there can be used zirconium potassium fluoride $KZrF_6$, zirconium ammonium fluoride $(NH_4)_2ZrF_6$ and zirconium ammonium carbonate solution $(NH_4)_2ZrO(CO_3)_2$. Further, the zirconium ions and fluorine ions can be supplied from separate agents. As the Zr agent, there can be used zirconium oxynitrate $ZrO(NO_3)_2$ and zirconium oxyacetate $ZrO(CH_3COO)_2$. As the F agent, there can be used sodium fluoride NaF, pottasium fluoride KF and ammonium fluoride $NH_4F$.

It is desired that the concentration of F ions in the bath is in a range of 0.03 to 0.35 mols/liter calculated as F. When the concentration of fluorine ions is lower than the above range, a gel-like substance is formed on the surface of a metal which is the cathode to impair the handling property during the continuous production. From the standpoint of properties, the surface loses the stability with the passage of time in a high-temperature and highly humid environment, which is not desirable. When the bath temperature is higher than the above range, the precipitation efficiency is impaired, and precipitates tends to build up in the bath, which is not desirable.

As required, further, the aqueous solution used for the surface treatment may contain nitric acid ions, a peroxide and a complexing agent. The nitric acid ions work to maintain safety in the precipitating state when the electrolysis is conducted for extended periods of time. There can be used nitric acid, sodium nitrate, potassium nitrate or ammonium nitrate as an ion source. The peroxide generates oxygen in an aqueous solution and works to suppress the polarization of concentration near the cathode surface, and is particularly effective when the bath is poorly stirred. As the peroxide, there can be used, for example, hydrogen peroxide, ammonium peroxodisulfate, potassium peroxodisulfate, sodium peroxoborate, sodium peroxocarbonate and sodium peroxodisulfate. The complexing agent works to suppress the formation of precipitate in the bath. There can be used ethylenediaminetetraacetic acid, sodium ethylenediaminetetraacetate, citric acid, sodium citrate, boric acid, nitrilotriacetic acid, sodium nitrilotriacetate, cyclohexanediaminetetraacetic acid and glycine. When added at too high concentrations, the nitric acid ions, peroxide and complexing agent tend to impair the efficiency of precipitation. It is desired that the concentrations of nitric acid ions, peroxide and complexing agent are not larger than 0.2 mols/liter.

As the pretreatment for the metal material base, there are effected, according to customary methods, the dewaxing, washing with water and, as required, washing with an acid, washing with water to cleanse the surfaces. Then, while stirring the above aqueous solution at a temperature of 30 to 65° C., the intermittent electrolysis is conducted at a current density of 0.5 to 100 $A/dm^2$ repeating the cycle of flowing the current and interrupting the current, to effect the cathodic electrolysis for a total electrolysis time of 0.3 to 20 seconds, followed finally by washing with water to obtain a favorable surface structure.

As the opposing electrode corresponding to the anode side, there is preferably used a titanium plate coated with iridium oxide. It is desired that the opposing electrode plate is a nondissolving anode that does not dissolve in the treating solution during the electrolysis and has a low oxygen permeation voltage.

(Resin-Coated Metal Material)

The resin-coated metal material of the present invention has a layer of an organic resin and, particularly, of a polyester resin formed on at least one surface of the surface-treated metal material. The resin film is intimately fitted and excellently adhered to the surface-treated metal material to impart excellent corrosion resistance and dent resistance.

Figure 9:
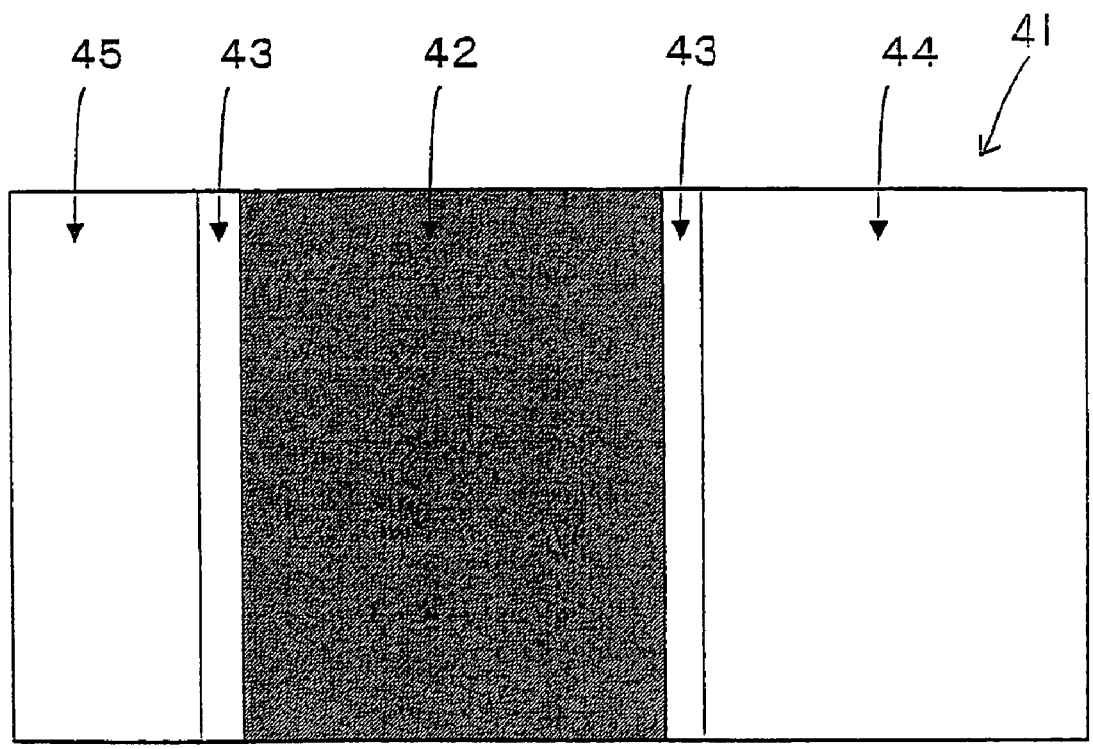
FIG. 9 is a diagram illustrating a resin-coated metal material of the present invention.

Referring to FIG. 9 which is a sectional view of the resin-coated metal material of the present invention, the resin-coated metal material 41 has a multi-layer structure comprising a metal material base 42, surface-treating layers 43 formed on the surfaces of the base and containing Zr, O and F as chief components, and a polyester resin coating layer 44 formed thereon as viewed from the inside of the container (right side in the drawing). In the example of FIG. 9, an outer resin protection layer 45 is formed on the outer surface side of the container (left side in the drawing) via the inorganic surface-treating layer 43. Here, the outer resin protection layer 45 may be made of the same polyester resin as the polyester resin coating layer 44, may be made of a different polyester resin, or may be made of a different resin.

Figure 10:
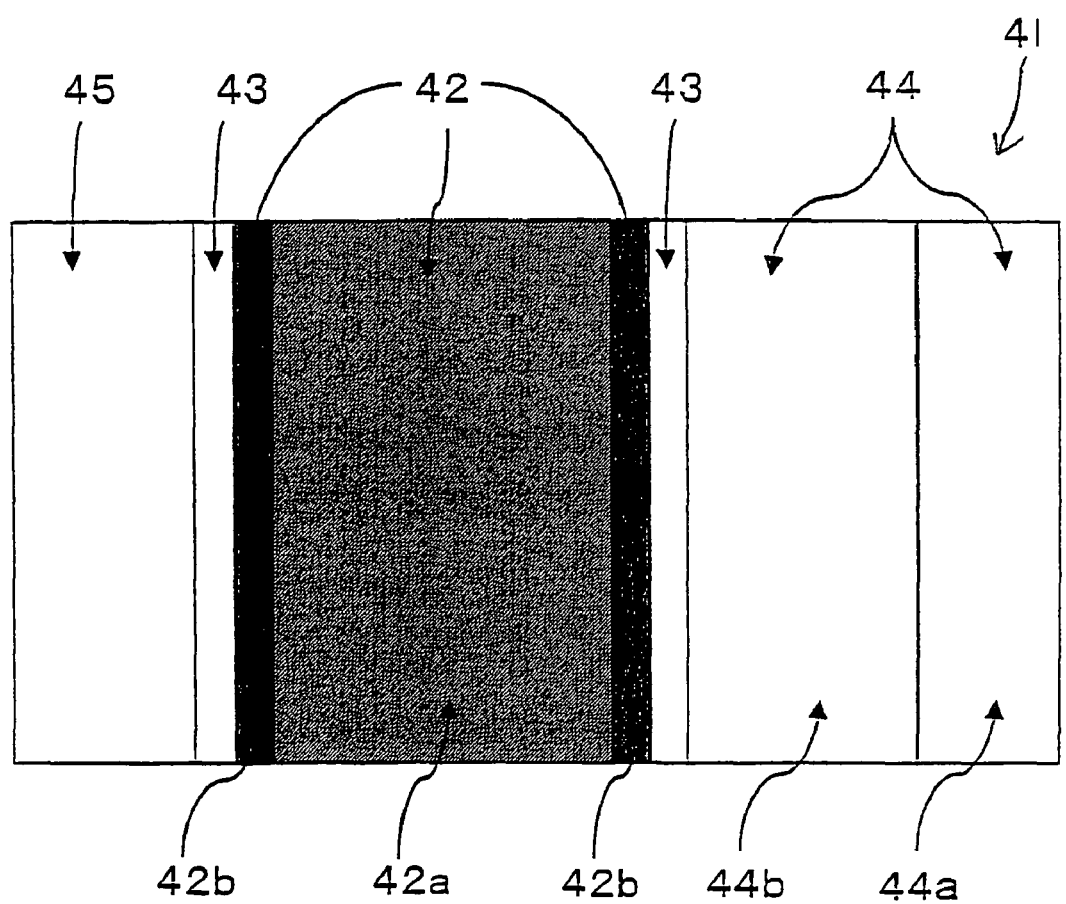
FIG. 10 is a diagram illustrating another resin-coated metal material of the present invention.

Referring to FIG. 10 illustrating another example of the resin-coated metal material, the resin-coated metal material 41 is the same as that of FIG. 9 with respect to the provision of the surface-treating layers 43 containing Zr, O and F as chief components, polyester resin layers 44 formed on one side of the base 42 which is the inside of the container, and the outer resin protection layer 45 formed on the outer side. Here, however, the base 42 is constituted by a metal material 42a and metal-plated layers 42b, and the polyester resin layer 44 has a laminated structure of a polyester resin surface layer 44a and a polyester resin lower layer 44b. The metal-plated layers 42b formed on the metal material 42a occupying a large proportion of the base 42 play the role of enhancing the corrosion resistance of the metal material 42a as described already. The polyester resin lower layer 44b is the one that excellently adheres to the metal base, and the polyester resin surface layer 44a is the one that exhibits excellent resistance against the content as described already.

(Organic Resin Coating Layer)

In the resin-coated metal material of the present invention, there is no particular limitation on the organic resin formed on the metal material, and there can be used various thermoplastic resins and thermosetting or thermoplastic resins.

As the organic resin, there can be used olefin resin films such as of polyethylene, polypropylene, ethylene/propylene copolymer, ethylene/vinyl acetate copolymer, ethylene/acrylic ester copolymer and ionomer; polyester film such as polybutylene terephtalate; polyamide films such as of nylon 6, nylon 6,6, nylon 11 and nylon 12; and thermoplastic resin films such as polyvinyl chloride film and polyvinylidene chloride film which may not be stretched or which may be biaxially stretched. When an adhesive is used for the lamination, there are preferably used an urethane adhesive, an epoxy adhesive, an acid-modified olefin resin adhesive, a copolyamide adhesive or a copolyester adhesive (thickness: 0.1 to 5.0 μm). Or, the thermosetting coating material may be applied onto the surface-treated metal plate or onto the film maintaining a thickness of 0.05 to 2 μm and may be used as an adhesive.

As the organic resin, there can be used modified epoxy coating materials such as phenolepoxy and aminoepoxy, or thermoplastic or thermosetting coating materials such as a vinyl chloride/vinyl acetate copolymer, a saponified product of a vinyl chloride/vinyl acetate copolymer, a vinyl chloride/vinyl acetate/maleic anhydride copolymer, an epoxy-modified, epoxyamino-modified, or an epoxyphenol-modified vinyl coating material or a modified vinyl coating material, acrylic coating material or a synthetic rubber coating material like styrene/butadiene copolymer, which may be used alone or in a combination of two or more kinds.

Among them, the polyester resin is most preferably used as a material for containers. As the polyester resin, there can be used a thermoplastic polyester derived from an alcohol component comprising chiefly an ethylene glycol or a butylene glycol and an acid component such as aromatic dibasic acid like terephthalic acid, isophthalic acid or naphthalenedicarboxylic acid.

As the polyester, there can be used a polyethylene terephthalate itself. Here, however, it is desired to lower a maximum degree of crystallinity of the film that can be reached from the standpoint of impact resistance and workability. For this purpose, it is desired to introduce a copolymer ester unit other than the ethylene terephthalate into the polyester. It is particularly desired to use a copolymerized polyester comprising chiefly an ethylene terephthalate unit or a butylene terephthalate unit, containing other ester units in small amounts and having a melting point of 210 to 252° C. The homopolyethylene terephthalate has a melting point which is generally 255 to 265° C.

Generally, it is preferred that not less than 70 mol % and, particularly, not less than 75 mol % of the dibasic acid component in the copolymerized polyester comprises a terephthalic acid component, not less than 70 mol % and, particularly, not less than 75 mol % of the diol component comprises an ethylene glycol or a butylene glycol, and 1 to 30 mol % and, particularly, 5 to 25 mol % of the dibasic acid component comprises a dibasic acid component other than the terephthalic acid.

As the dibasic acid other than the terephthalic acid, there can be exemplified aromatic dicarboxylic acids such as isophthalic acid, phthalic acid, and naphthalenedicarboxylic acid; alicyclic dicarboxylic acids such as cyclohexanedicarboxylic acid; aliphatic dicarboxylic acids such as succinic acid, adipic acid, sebacic acid and dodecanedioic acid, which may be used in one kind or in a combination of two or more kinds. As the diol components other than the ethylene glycol or the butylene glycol, there can be exemplified a propylene glycol, a diethylene glycol, a 1,6-hexylene glycol, a cyclohexane dimethanol or an ethylene oxide adduct of bisphenol A, which may be used in one kind or in two or more kinds. It is desired that these comonomers are so combined together that the melting point of the copolymerized polyester lies within the above-mentioned range.

In order to improve the melt flow characteristics during the molding, the polyester may contain at least one kind of branching or crosslinking component selected from the group consisting of trifunctional or higher functional polybasic acids and polyhydric alcohols. It is desired that the branching or crosslinking component is not larger than 3.0 mol % or, preferably, in a range of 0.05 to 3.0 mol %.

As the trifunctional or higher functional polybasic acids and polyhydric alcohols, there can be exemplified polybasic acids such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, and biphenyl-3,4,3',4'-tetracarboxylic acid; polyhydric alcohols such as pentaerythritol, glycerol, trimethylolpropane, 1,2,6-hexanetriol, sorbitol, and 1,1,4,4-tetrakis(hydroxymethyl) cyclohexane.

In the resin-coated metal material of the present invention, a particularly preferred polyester resin that can be used as a material for cans and for can lids is a polyethylene terephthalate/isophthalate containing 5 to 25 mol % of an isophthalic acid component, or a polyethylene/cyclohexylenedimethylene terephthalate containing 1 to 10 mol % of cyclohexane dimethanol component.

The homopolyester or the copolymerized polyester should have a molecular weight in a range of forming a film and an inherent viscosity [η] in a range of 0.5 to 1.5 and, particularly, 0.6 to 1.5 as measured by using, as a solvent, a phenol/tetrachloroethane mixed solvent.

The polyester resin layer used in the present invention may be formed by using the above-mentioned polyester or copolyester alone, by using a blend of two or more kinds of polyesters or copolyesters, or by using a blend of a polyester or a copolyester and other thermoplastic resin. As the blend of two or more kinds of polyesters or copolyesters, there can be exemplified combinations of two or more kinds of polyethylene terephthalate, polybutylene terephthalate, polyethylene terephthalate/isophthalate, and polyethylene/cyclohexylenedimethylene terephthalate, though the invention is not limited thereto only as a matter of course.

Other thermoplastic resins that can be blended in the polyester include an ethylene polymer, a thermoplastic elastomer, a polyarylate and a polycarbonate. At least one of these reforming resin components is further contained to improve resistance against high temperatures and high humidities and to improve impact resistance. The reforming resin component is usually used in an amount of up to 50 parts by weight and, particularly preferably, in an amount of 5 to 35 parts by weight per 100 parts by weight of the polyester.

As the ethylene polymer, there can be exemplified low-, medium- or high-density polyethylene, linear low-density polyethylene, linear ultra-low-density polyethylene, ethylene/propylene copolymer, ethylene/butene-1 copolymer, ethylene/propylene/butene-1 copolymer, ethylene/vinyl acetate copolymer, ionically crosslinked olefin copolymer (ionomer), and ethylene/acrylic acid ester copolymer. Among them, the ionomer is preferred. As the base polymer of the ionomer, there can be used an ethylene/(meth)acrylic acid copolymer and an ethylene/(meth)acrylic acid ester/(meth)acrylic acid copolymer. As the ions, there can be used Na, K and Zn. As the thermoplastic elastomer, there can be used, for example, a styrene/butadiene/styrene block copolymer, a styrene/isoprene/styrene block copolymer, a hydrogenated styrene/butadiene/styrene block copolymer, and a hydrogenated styrene/isoprene/styrene block copolymer.

The polyarylate is defined as a polyester derived from a divalent phenol and a dibasic acid. As the divalent phenol, there can be used bisphenols such as 2,2'-bis(4-hydroxyphenyl)propane(bisphenol A), 2,2'-bis(4-hydroxyphenyl)butane (bisphenol B), 1,1'-bis(4-hydroxyphenyl)ethane, bis(4-hydroxyphenyl)methane(bisphenol F), 4-hydroxyphenyl ether, and p-(4-hydroxy)phenol. Among them, however, it is desired to use the bisphenol A and the bisphenol B. As the dibasic acid, there can be used terephthalic acid, isophthalic acid, 2,2-(4-carboxyphenyl)propane, 4,4'-dicarboxydiphenyl ether, and 4,4'-dicarboxybenzophenone. The polyarylate may be a homopolymer derived from the above monomer component or may be a copolymer thereof.

In a range without spoiling the essential natures, further, the polyarylate may be a copolymer with an ester unit derived from the aliphatic glycol and the dibasic acid. The polyarylate is available as a U-series or an AX-series of U-polymer of Unitika Co., as Arde ID-100 of UCC Co., as APE of Bayer Co., as Durel of Hoechst Co., as Arylon of du Pont Co., and as NAP resin of Kanegafuchi Kagaku Co.

The polycarbonate is a carbonic acid ester resin derived from bicyclic dihydric phenols and phosgene, and features a high glass transition point and heat resistance. The polycarbonate is the one derived from bisphenols such as 2,2'-bis(4-hydroxyphenyl)propane(bisphenol A), 2,2'-bis(4-hydroxyphenyl)butane(bisphenol B), 1,1'-bis(4-hydroxyphenyl)ethane, bis(4-hydroxyphenyl)methane(bisphenol F), 1,1-bis(4-hydroxyphenyl)cyclohexane, 1,1-bis(4-hydroxyphenyl)cyclopentane, 1,1-bis(4-hydroxyphenyl)-1-phenylmethane, 1,1-bis(4-hydroxyphenyl)-1-phenylethane and 1,2-bis(4-hydroxyphenyl)ethane.

The polyester resin layer used in the invention may be a single resin layer or a multiplicity of resin layers formed by the simultaneous extrusion. When a multiplicity of polyester resin layers are used, a polyester resin of a composition having excellent adhesion can be selected on the side of the underlying layer, i.e., on the side of the surface-treated metal material, and a polyester resin of a composition having excellent resistance against the content, i.e., having excellent resistance against being extracted and excellent property for not absorbing flavor components, can be used as the surface layer to advantage.

If described as surface layer/lower layer, examples of the multiplicity of polyester resin layers include a polyethylene terephthalate/polyethylene terephthalate isophthalate, a polyethylene terephthalate/polyethylene cyclohexylenedimethylene terephthalate, a polyethylene terephthalate isophthalate having a small isophthalate content/polyethylene terephthalate isophthalate having a large isophthalate content, and a polyethylene terephthalate isophthalate/[blend of a polyethylene isophthalate and a polybutylene terephthalate adipate], which, however, are not to limit the invention. It is desired that the thickness ratio of the surface layer/lower layer is in a range of 5:95 to 95:5.

The polyester resin layer may be blended with known blending agents for resins, such as amorphous silica which is an anti-blocking agent, an inorganic filler, various antistatic agents, lubricant, antioxidant and ultraviolet ray-absorbing agent according to a known recipe.

Among them, it is desired to use a tocopherol (vitamine E). It has been known that the tocopherol works as an antioxidant and improves the dent resistance by preventing a decrease in the molecular weight caused by the degradation when the polyester resin is heat-treated. When the tocopherol is added to a polyester composition obtained by blending the polyester resin with the above ethylene polymer as a reforming resin component, not only the dent resistance is improved but also corrosion is prevented from advancing starting with the cracks that have occurred in the film when it is subjected to severe conditions such as retort sterilization or a hot vendor, and the corrosion resistance is markedly improved.

It is desired that the tocopherol is blended in an amount of 0.05 to 3% by weight and, particularly, in an amount of 0.1 to 2% by weight.

It is desired that the thickness of the organic resin layer is usually in a range of 3 to 50 μm and, particularly, 5 to 40 μm. When the thickness becomes smaller than the above range, the corrosion resistance becomes insufficient. When the thickness becomes greater than the above range, on the other hand, problems occur in regard to workability.

(Production of the Resin-Coated Metal Material)

In the present invention, the polyester coating layer can be formed on the surface-treated metal material by any means, such as an extrusion coating method, a cast film heat-adhesion method or a biaxially stretched film heat-adhesion method. In the case of the extrusion coating method, the surface-treated metal material is extrusion-coated with a polyester resin in a molten state which is, then, heat-adhered. That is, the polyester resin is melt-kneaded by using an extruder, extruded from a T-die like a thin film, the molten resin film that is extruded is passed through a pair of laminate rolls together with the surface-treated metal material, and is pushed integrally therewith while being cooled and is, then, quickly cooled. To extrusion-coat the surface-treated metal material with a multiplicity of polyester resin layers, there are used an extruder for the surface layer resin and an extruder for the lower layer resin, and the resins flowing from the extruders are met together in a multiplex multi-layer die. Thereafter, the extrusion coating is effected in the same manner as that of the case of the single layer resin. Further, the surface-treated metal material is passed through the pair of laminate rolls perpendicularly thereto, and molten resin webs are supplied on both sides thereof thereby to form coating layers of the polyester resin on both surfaces of the base.

Concretely speaking, the resin-coated metal material is produced by the extrusion coating method in a manner as described below. The surface-treated metal material (hereinafter often referred to simply as metal material) is, as required, pre-heated by using a pre-heating device and is fed to a nipping position between a pair of laminate rolls. On the other hand, the polyester is extruded into the form of thin films through a die head of an extruder and is fed to between the laminate rolls and the metal material so as to be press-adhered onto the metal material by the laminate rolls. The laminate rolls are maintained at a predetermined temperature, and work to press-adhere thin films of the thermoplastic resin such as a polyester onto the metal material so that the two are heat-adhered together, followed by cooling from both sides to obtain the resin-coated metal material. In general, the formed resin-coated metal material is further guided to a water vessel for cooling to effect the quick cooling to prevent the crystallization by heat.

According to the extrusion-coating method, the polyester resin layer is suppressed to possess a degree of crystallinity of a low level and to possess a difference from the amorphous density of not larger than 0.05 g/cm$^3$ as a result of selecting the resin composition and employing the quick cooling using the rolls and the cooling vessel, to guarantee a sufficient degree of workability for the subsequent work of producing cans and lids. The quick cooling operation is not limited to the above example only. Instead, the cooling water may be sprayed onto the resin-coated metal material that is formed to quickly cool the laminated plate.

The polyester resin is heat-adhered to the metal material relying upon the amount of heat possessed by the molten resin layer and the amount of heat possessed by the metal material. The metal material is heated at a temperature ($T_1$) which is usually 90 to 290° C. and, particularly, 100 to 280° C. On the other hand, the laminate rolls are heated at a temperature of 10 to 150° C.

The resin-coated metal material of the present invention can be further produced by heat-adhering, onto the metal material, the polyester resin films formed in advance by the T-die method or the inflation film-forming method. As the films, there can be used undrawn films formed by the cast-forming method by quickly cooling the extruded films, or biaxially drawn films formed by biaxially drawing the films at a drawing temperature successively or simultaneously and heat-setting the films that have been drawn.

In the present invention, there can be employed a variety of constitutions in addition to the above layer constitutions, and a known primer for adhesion may be provided between the surface-treated metal material and the polyester layers. The adhesion primer excellently adheres to both the metal material and the films. The primer coating material exhibiting excellent adhesion and corrosion resistance is the one comprising a bisphenol-type epoxy resin and a resol-type phenol-aldehyde resin derived from various phenols and formaldehydes, containing the phenol resin and the epoxy resin at a weight ratio of 50:50 to 1:99 and, particularly, 40:60 to 5:95. The adhesive primer layer is usually formed maintaining a thickness of 0.01 to 10 μm. The adhesive primer layer may be formed on the metal material in advance, or may be formed on the polyester films.

(Metal Can and Method of Its Production)

The metal can of the invention may be produced by any production method so far as the above resin-coated metal material is used. The metal can may be a three-piece can having a seam on the side surface but is, preferably, a seamless can (two-piece can). The seamless can is produced by known means such as draw/redraw working, bend-draw working based on draw/redrawing (stretch working), bend-draw/ironing working based on draw/redrawing, or draw/ironing working in a manner that the coating surface of the polyester resin of the surface-treated metal material becomes the inside of the can.

Figure 11:
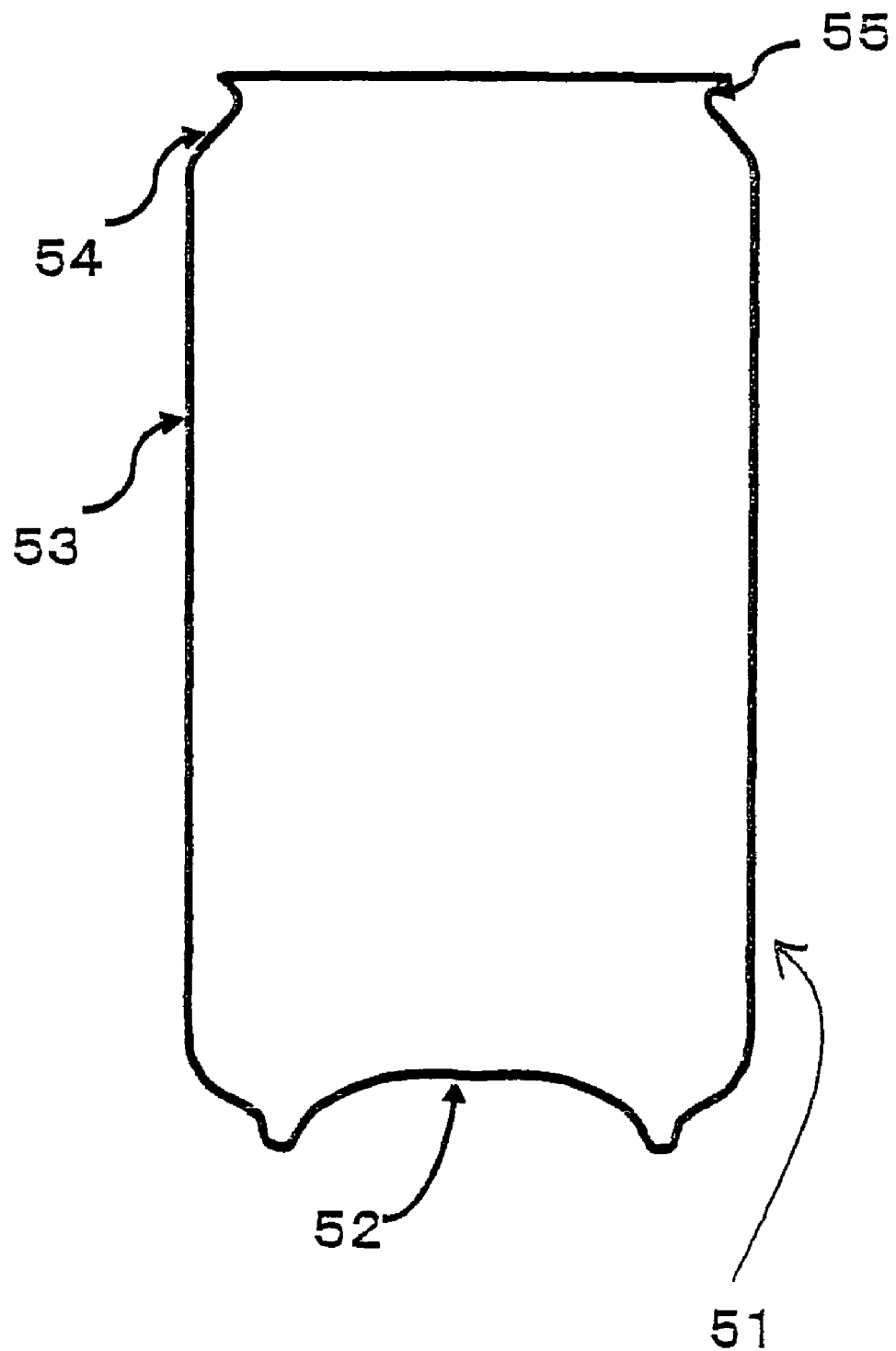
FIG. 11 is a side view of a seamless can which is a metal can of the present invention.

Referring to FIG. 11 illustrating a seamless can which is a metal can of the present invention, the seamless can 51 is formed by drawing/ironing the above resin-coated metal material, and includes a bottom portion 52 and a barrel portion 53. The bottom portion 52 and the barrel portion 53 are continuous without seam. The bottom portion 52 has, in the central portion thereof, a thickness constitution substantially the same as the resin-coated metal material that is used. Here, however, at least a portion of the barrel portion 53 has a thickness that is decreased to 30% to 70% of the initial plate thickness. A can lid and a flange portion 55 for wrap-seam are formed in the upper part of the barrel portion 53 via a neck portion 54 of a single stage or a multiplicity of stages.

As described already, the seamless can is produced through drawing and ironing. Here, the drawing and ironing may be effected simultaneously through one stroke or may be effected through separate strokes.

According to a preferred method of producing the seamless can, for example, the resin-coated metal material is sheared into a circular shape, shallow-draw-formed into a cup through the combination of a drawing die and a drawing punch, put to the step of simultaneous draw-ironing effecting the drawing and ironing in the same metal mold repetitively a plural number of times to form a cup having a small diameter but a large height. According to this molding method, the deformation for decreasing the thickness is effected through the deformation (bend-elongation) by the load in the direction of can axis (direction of height) and the deformation (ironing) by the load in the direction of can thickness in this order offering an advantage in that the molecules are effectively oriented in the direction of can axis. Then, there are effected doming, heat treatment for removing the residual distortion in the coated resin caused by the working, trimming at the open end, printing on the curved surfaces, necking and flanging to produce the can.

The metal can of the invention can be produced by a known method, such as the draw/ironing method disclosed in Japanese Unexamined Patent Publication (Kokai) No. 4-231120 and the simultaneous draw/ironing method disclosed in Japanese Unexamined Patent Publication (Kokai) No. 9-253772.

(Can Lid and Method of Its Production)

The metal lid of the invention may be produced by any production method so far as the above resin-coated metal material is used. The can lid can be, generally, an easy-open can lid of the stay-on type or an easy-open can lid of the full-open type.

Figure 12:
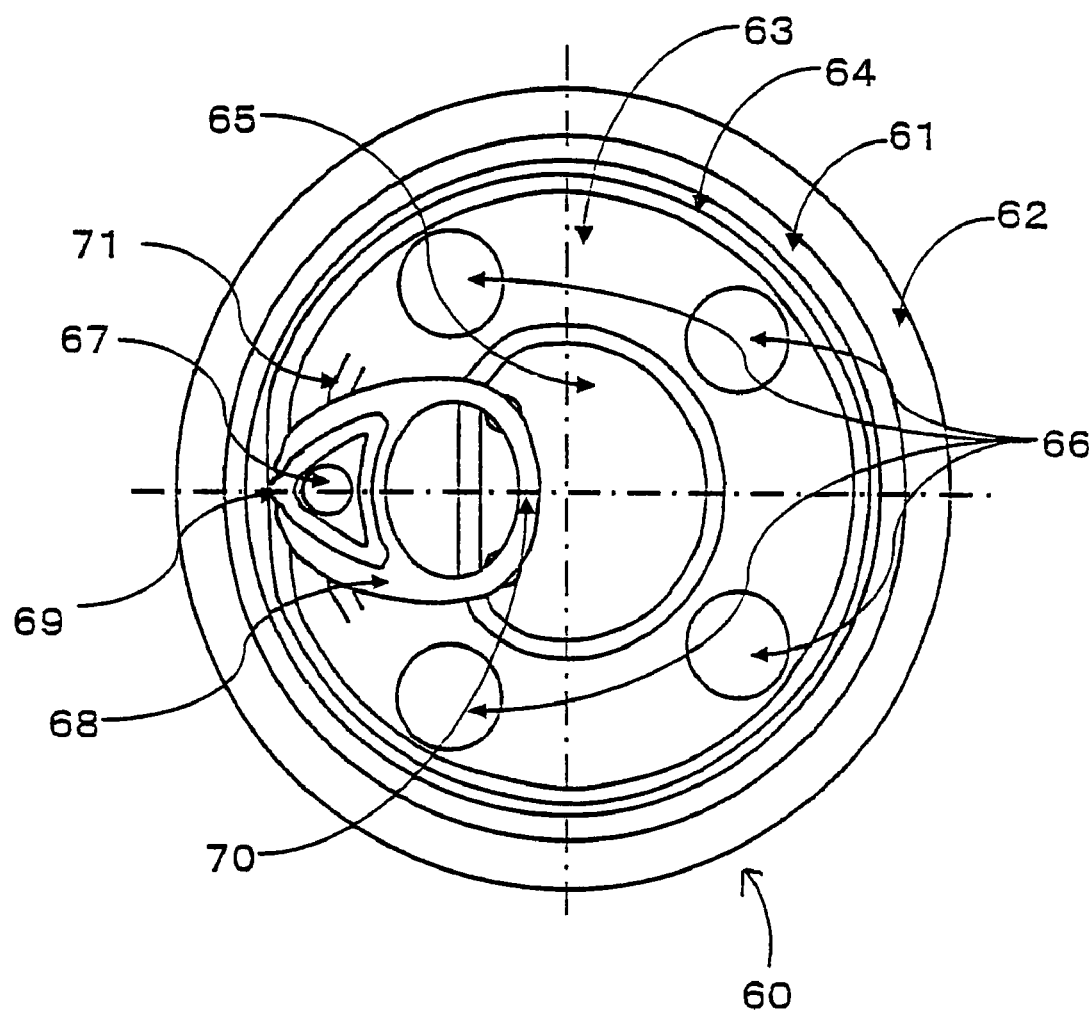
FIG. 12 is a plan view of an easy-open can lid which is a can lid of the present invention.
Figure 13:
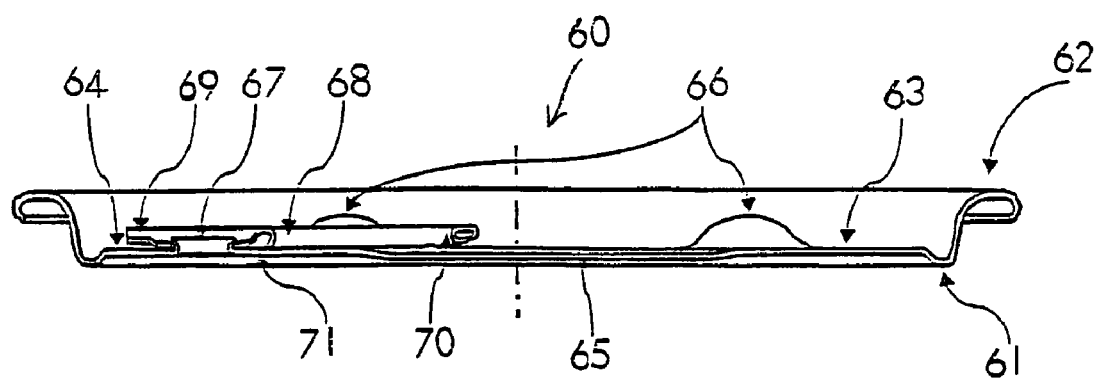
FIG. 13 is an enlarged sectional view along the line X-X in FIG. 12.

Referring to FIG. 12 which is a top view of the easy-open can lid of the invention and FIG. 13 which is a sectional view thereof on an enlarged scale, the lid 60 is made of the above-mentioned resin-coated metal material and includes a sealing groove 62 formed in the outer peripheral side thereof via an annular rim (counter sink) 61 that is to be fitted to the inner side surface of the can barrel. A score 64 is formed on the inside of the annular rim 61 over the whole circumference to sectionalize a portion 63 that is to be opened. On the inside of the portion 63 that is to be opened, there are formed a recessed panel 65 of nearly a semicircular shape of which the central portion is roughly pushed in, dimples 66 formed by protruding the lid member surrounding the recessed panel 65, and a rivet 67 formed by protruding the lid member toward the outer side of the can lid. A tab 68 for opening is secured by the rivet 67. The tab 68 for opening has, at one end thereof, an end 69 for opening by push-cleaving and, at the other end thereof, a ring 70 for holding. Near the rivet 67, a break-starting score 71 is formed on the side opposite to the score 64 in parallel with the score 64 but discretely.

To open the lid, the ring 70 of the tab 68 for opening is held and is lifted up. Then, the break-starting score 71 breaks, the end 69 for opening of the tab 68 is pushed down relatively greatly, and the score 64 partly starts shearing.

Then, the ring 70 is pulled up, and the remaining portion of the score 64 is broken over the whole circumference to easily open the lid.

The lid of the above concrete example is the one of the so-called full-open type. The invention, however, can also be applied to the easy-open lid of the stay-on type as a matter of course.

According to a preferred method of producing the easy-open can lid, the resin-coated metal material is punched into a circular shape through a press-forming step to define the shape of the lid, the groove for sealing is lined with a compound which is then dried. Then, the score is engraved so as to reach the midway of the metal blank from the outer surface side of the lid. Then, the rivet is formed, the tab is attached to the rivet; i.e., the tab is attached by riveting to thereby form the easy-open can lid. A preferred easy-open can lid has been disclosed in, for example, Japanese Unexamined Patent Publication No. 2000-128168.

EXAMPLES

Next, the invention will be concretely described together with its effect by way of Examples and Comparative Examples.

The metal container is placed under the severest environment from the standpoint of working the surface-treated metal material or working the resin-coated metal material and the corrosion resistance. Though Examples deal with metal cans and can lids, the invention is in no way limited to these Examples only.

Treatment baths were obtained by so adjusting the aqueous solution as to contain zirconium ions and fluorine ions at mol concentrations shown in Table 1 calculated as Zr and F but without containing phosphoric acid ions. As zirconium agents, there were used zirconium potassium fluoride for the treatment baths A, B, C and E, zirconium ammonium fluoride for the treatment bath D, and zirconium oxynitrate for the treatment baths F and G. Further, sodium fluoride was added to the treatment baths A and F at predetermined concentrations.

TABLE 1

| Treatment bath | Zr (mol/l) | F (mol/l) |
|---|---|---|
| A | 0.022 | 0.156 |
| B | 0.022 | 0.132 |
| C | 0.033 | 0.198 |
| D | 0.207 | 1.242 |
| E | 0.088 | 0.529 |
| F | 0.022 | 0.050 |
| G | 0.100 | — |

[Preparation of a Polyester Film]

Polyester resins chiefly comprising ethylene terephthalate units of compositions shown in Table 2 were melt-extruded from two extruders through a two-layer T-die, cooled through cooling rolls, and the formed films were taken up to obtain cast films a, b, c, d and e of constitutions shown in Table 3.

TABLE 2

| | Polyester component | | Ionomer | Tocopherol | Titanium |
|---|---|---|---|---|---|
| | Copolymerizable component | Copolymerizing ratio (wt %) | Content (wt %) | Content (wt %) | Content (wt %) | Content (wt %) |
| A | isophthalic acid | 12 | 100 | — | — | — |
| B | isophthalic acid | 5 | 100 | — | — | — |
| C | isophthalic acid | 5 | 84 | 15 | 1 | — |
| D | isophthalic acid | 12 | 75 | — | — | 25 |
| E | isophthalic acid | 15 | 84 | 15 | 1 | — |

TABLE 3

| | Surface layer | | Lower layer | |
|---|---|---|---|---|
| | Resin composition | Thickness (μm) | Resin composition | Thickness (μm) |
| a | A | 12 | — | — |
| b | B | 5 | C | 25 |
| c | C | 30 | — | — |
| d | A | 5 | D | 10 |
| e | B | 5 | E | 25 |

[Measurement of Surface Atomic Ratio]

The metal material after having treated the surfaces thereof was measured for its peaks $P2p$, $O1s$, $F1s$ and $Zr3d$ by using an X-ray photoelectron spectrometer (XPS) under the following conditions, and the atomic ratios P/Zr, O/Zr and F/Zr were found by calculation from the atomic concentrations obtained by using an analytical software.

Device: Quantum 2000, manufactured by PHI Co.
Exciting X-ray source: Al Monchrometer 75 W-17 kV
Measuring diameter: φ100 μm
Photoelectron take-out angle: 90° (0° relative to the normal of the sample)
Analytical software: MultiPak

[Evaluation of Adhesion]

The surface-treated metal material was cut into a short strip measuring 5 mm in width and 80 mm in length, and the cast film represented by c in Table 3 was cut into a short strip measuring 5 mm in width and 80 mm in length. The above polyester film piece was sandwiched between the thus obtained two pieces of the surface-treated short strips, and was heated at 250° C. for 3 seconds under a pressure of 2.0 kg/cm² to obtain a T-peel test piece. Thereafter, the retort treatment was conducted at 110° C. for 60 minutes. Immediately after the retort treatment, the test piece was immersed in the water, pulled out from the water just prior to taking the measurement by using a tensile tester, and the adhering strength was measured at a tension speed of 10 mm/min.

Example 1

1. Preparation of the Surface-Treated Metal Plate

As a metal plate, there was used an aluminum alloy plate JIS 5021H18 having a thickness of 0.25 mm. By using a dewaxing agent 322N8 (manufactured by Nihon Paint Co.), this aluminum alloy plate was treated according to a customary method in a bath heated at 70° C. for 10 seconds, and was pre-treated such as washed with water, immersed in a 1% sulfuric acid maintained at 40° C. for 5 seconds, washed with water, and washed with pure water. Then, in the treatment bath represented by A in Table 1 maintained at a bath temperature of 45° C., the cathodic electrolysis was intermittently conducted with stirring by using a titanium plate coated with iridium oxide as an anode which was arranged at a position maintaining a distance of 30 mm at a current density of 10 A/dm², repeating the cycle of flowing the current for 0.4 seconds and interrupting the current for 0.6 seconds four times, followed by the after-treatment of washing with flushing water, washing with pure water and drying to thereby obtain a surface-treated aluminum plate.

2. Preparation of the Resin-Coated Metal Plate

By using the surface-treated metal plate obtained above, there was prepared a resin-coated metal plate for lids according to the method described below.

First, the lower side of the cast film represented by b in Table 3 was heat-adhered onto one surface which was the inner side of the lid of the surface-treated metal plate heated at 250° C. by using laminate rolls, and was immediately cooled with water to laminate the film on one surface.

Next, an epoxyacrylic coating material was applied by roll-coating onto the another surface of the metal plate which was the outer side of the lid, and the baking was conducted by being heated at 185° C. for 10 minutes.

3. Evaluation of the Surface-Treated Metal Plate

Part of the thus obtained surface-treated metal plate was measured for its Zr film thickness, surface atomic ratio and was evaluated for its adhesion. The results were as shown in Table 4.

In Table 4, the adhesion was evaluated to be ⊚ when a maximum tensile strength was not smaller than 0.6 kg/5 mm after the test piece was peeled by more than 10 mm by using a tensile tester, was evaluated to be ○ when the maximum tensile strength was not smaller than 0.3 kg/5 mm but was smaller than 0.6 kg/5 mm, and was evaluated to be X when the maximum tensile strength was smaller than 0.3 kg/5 mm.

4. Evaluating the Opening Performance of the Can Lid

By using the obtained resin-coated metal plate, a full-open can lid of a diameter of 301 was formed according to a predetermined method, and was, then, wrap-seamed to a 350-g seamless can barrel obtained by draw-ironing an aluminum plate, which has been filled with water. Thereafter, the retort sterilization processing was effected at 110° C. for 60 minutes. After cooled, the lid was readily opened to observe the resin-peeling state at the opening in the periphery of the score portion and the opening performance of the can lid was evaluated. The results were as shown in Table 4.

By observing the feathering near the opening, the opening performance of the can lid was evaluated in Table 4 to be ○ when the feathering was smaller than 0.5 mm without the resin peeling, and was evaluated to be X when the feathering was not smaller than 0.5 mm.

Example 2

The surface was treated, the resin was applied, and the lid was prepared to evaluate in the same manner as in Example 1 but by using the treatment bath represented by B in Table 1 and selecting a current density to be 3 A/dm$^2$.

Example 3

The surface was treated, the resin was applied, and the lid was prepared to evaluate in the same manner as in Example 1 but by using the treatment bath represented by B in Table 1 and selecting a current density to be 5 A/dm$^2$.

Example 4

The surface was treated, the resin was applied, and the lid was prepared to evaluate in the same manner as in Example 1 but by using the treatment bath represented by C in Table 1.

Example 5

The surface was treated, the resin was applied, and the lid was prepared to evaluate in the same manner as in Example 1 but by using the treatment bath represented by D in Table 1.

Example 6

The surface was treated, the resin was applied, and the lid was prepared to evaluate in the same manner as in Example 1 but by using the treatment bath represented by E in Table 1 and continuously effecting the electrolysis for 0.4 seconds only one time.

Example 7

The surface was treated, the resin was applied, and the lid was prepared to evaluate in the same manner as in Example 1 but by adding dipotassium hydrogenphosphate in an amount of 0.001 mol/liter to the treatment bath represented by B in Table 1, and effecting the cathodic electrolysis by repeating four times a cycle of flowing a current for 0.6 seconds and interrupting the current for 0.4 seconds.

Example 8

The surface was treated, the resin was applied, and the lid was prepared to evaluate in the same manner as in Example 1 but by adding dipotassium hydrogenphosphate in an amount of 0.002 mol/liter to the treatment bath represented by B in Table 1, and effecting the cathodic electrolysis by repeating eight times a cycle of flowing a current for 0.6 seconds and interrupting the current for 0.4 seconds.

Example 9

The surface was treated, the resin was applied, and the lid was prepared to evaluate in the same manner as in Example 1 but by conducting the cathodic electrolysis using the treatment bath represented by F in Table 1.

Comparative Example 1

By using a metal plate that has been dewaxed and washed with water used in Example 1, the resin was applied and the lid was prepared to evaluate in the same manner as in Example 1 with the exception of obtaining a bath according to a customary method by using a commercially available zirconium type chemical treatment solution (Arosin 404 manufactured by Nihon Parkerizing Co., Ltd.), effecting the spray treatment at a solution temperature of 40° C. for 15 seconds, readily followed by the after-treatment of washing with water, washing with pure water and drying to obtain a surface-treated aluminum plate.

Comparative Example 2

The surface was treated, the resin was applied, and the lid was prepared to evaluate in the same manner as in Comparative Example 1 but by selecting the spray treatment time to be 18 seconds.

Comparative Example 3

The surface was treated, the resin was applied, and the lid was prepared to evaluate in the same manner as in Example 1 but by adding dipotassium hydrogenphosphate in an amount of 0.005 mol/liter to the treatment bath represented by B in Table 1, and effecting the cathodic electrolysis by repeating four times a cycle of flowing a current for 0.6 seconds and interrupting the current for 0.4 seconds.

Comparative Example 4

The surface was treated in the same manner as in Example 1 but by adjusting the pH of the treatment bath represented by G in Table 1 to be 2.3 using ammonia and effecting the cathodic electrolysis without stirring. The film peeled off when it was washed with flushing water. After the electrolysis, therefore, the surface-treated metal plate was calmly immersed in the pool of water and was, then, dried. The resin was applied and the lid was prepared to evaluate in the same manner as in Example 1.

Comparative Example 5

The surface was treated in the same manner as in Comparative Example 4 but by effecting the cathodic electrolysis with stirring. The film peeled off when it was washed with flushing water. After the electrolysis, therefore, the surface-treated metal plate was calmly immersed in the pool of water and was, then, dried. The resin was applied and the lid was prepared to evaluate in the same manner as in Comparative Example 4.

Comparative Example 6

The treatment bath represented by G in Table 1 was used. The surface was treated in the same manner as in Comparative Example 4 but effecting the cathodic electrolysis without adjusting the pH. The pH of the bath was 1.53. The film peeled off when it was washed with flushing water. After the electrolysis, therefore, the surface-treated metal plate was calmly immersed in the pool of water and was, then, dried. The resin was applied and the lid was prepared to evaluate in the same manner as in Comparative Example 4.

Comparative Example 7

The surface was treated in the same manner as in Comparative Example 6 but effecting the cathodic electrolysis with stirring. The film peeled off when it was washed with flushing water. After the electrolysis, therefore, the surface-treated metal plate was calmly immersed in the pool of water and was, then, dried. The resin was applied and the lid was prepared to evaluate in the same manner as in Comparative Example 4.

Example 10

1. Preparation of a Surface-Treated Metal Plate

The surface was treated in the same manner as in Example 1 but using, as a metal plate, an aluminum alloy plate JIS 3004H19 having a thickness of 0.26 mm.

2. Preparation of a Resin-Coated Metal Plate

The obtained surface-treated metal plate was heated at 250° C. in advance, and the lower side of the cast film represented by b in Table 3 was thermally press-adhered onto one surface of the metal plate that becomes the inner surface of the can lid and the cast film represented by a in Table 3 was thermally press-adhered onto the other surface thereof that becomes the outer surface thereof, by using laminate rolls, immediately followed by cooling with water to obtain a resin-coated metal plate.

3. Preparation of a Metal Can

A paraffin wax was electrostatically applied onto both surfaces of the obtained resin-coated metal plate which was, then, punched into a circle of a diameter of 154 mm to form a shallow-draw-formed cup according to a customary method. The draw-formed cup was subjected to the simultaneous draw-ironing working two times repetitively to form a cup having a small diameter but a large height. The thus obtained cup exhibited the following properties.

Cup diameter: 66 mm
Cup height: 128 mm
Thickness of can wall relative to the initial
plate thickness: −60%

After doming, the cup was heat-treated at 220° C. for 60 seconds to remove distortion from the resin film followed by trimming at the open end, printing on the curved surface, necking into a diameter of 206 and flanging to obtain a 350-g seamless can.

4. Evaluation of the Surface-Treated Metal Plate

Part of the thus obtained surface-treated metal plate was measured for its Zr film thickness, surface atomic ratio and was evaluated for its adhesion in the same manner as in Example 1. The results were as shown in Table 4.

5. Evaluation of Retort Adhesion of the Metal Can

The inner surface of the can after the flanging was cut over the whole circumference 5 mm below the open end so as to reach the blank. The empty can was held in the water vapor heated at 125° C. for 30 minutes, and the degree the coated resin was peeling near the scar in the inner surface of the can was observed to evaluate the retort adhesion. The results were as shown in Table 4.

In Table 4, the retort adhesion of the metal can was evaluated to be ○ when there was no peeling even partly in twenty cans, and was evaluated to be X when there was peeling even partly in twenty cans.

6. Evaluation of Corrosion of the Metal Can

A metal can packed with carbonated water in a manner that the pressure in the can at 25° C. was 3.5 kg/cm$^2$ was preserved at 37° C. for one week. Thereafter, the temperature of the can was lowered to 5° C. The metal can in its upright state was permitted to fall from a height of 50 cm on a steel plate of a thickness of 10 mm tilted by 15° relative to the horizontal direction, so that the bottom radius portion was deformed. Thereafter, the bottom portion of the can including the bottom radius portion was cut in the circumferential direction, immersed in an aqueous solution containing 0.1% of sodium chloride at 50° C. for 2 weeks to observe the corroding state near the deformed bottom radius portion to evaluate the corrosion.

The results were as shown in Table 4. The vicinity of the deformed bottom radius portion was observed through a microscope. In Table 4, the corrosion of the metal can was evaluated to be ○ when no corrosion was recognized and was evaluated to be X when the corrosion was recognized even by a small amount.

Example 11

The surface was treated, the resin was applied, and the can was prepared to evaluate in the same manner as in Example 10 but by using the treatment bath represented by B in Table 1 and selecting the current density to be 5 A/dm$^2$.

Example 12

The surface was treated, the resin was applied, and the can was prepared to evaluate in the same manner as in Example 10 but by using the treatment bath represented by C in Table 1.

Comparative Example 8

The surface was treated in the same manner as in Comparative Example 1 but using, as a metal plate, an aluminum alloy plate JIS 3004H19 having a thickness of 0.26 mm. The resin was applied and the can was prepared to evaluate in the same manner as in Example 10.

Comparative Example 9

The surface was treated, the resin was applied, and the can was prepared to evaluate in the same manner as in Comparative Example 8 but by selecting the spray treatment time to be 18 seconds.

TABLE 4

| | Zr gravimetric film thickness (mg/m$^2$) | Surface atomic ratio | | | Adhesion | Lid opening | Retort adhesion | Corrosion resistance |
| --- | --- | --- | --- | --- | --- | --- | --- | --- |
| | | O/Zr | F/Zr | P/Zr | | | | |
| Ex. 1 | 86 | 3.0 | 1.5 | 0.0 | ⊚ | ○ | — | — |
| Ex. 2 | 82 | 2.6 | 1.3 | 0.0 | ⊚ | ○ | — | — |
| Ex. 3 | 132 | 2.0 | 1.6 | 0.0 | ⊚ | ○ | — | — |
| Ex. 4 | 146 | 2.1 | 1.4 | 0.0 | ⊚ | ○ | — | — |
| Ex. 5 | 9 | 9.5 | 2.3 | 0.0 | ○ | ○ | — | — |
| Ex. 6 | 79 | 8.1 | 0.3 | 0.0 | ○ | ○ | — | — |
| Ex. 7 | 79 | 2.8 | 1.1 | 0.2 | ○ | ○ | — | — |
| Ex. 8 | 177 | 3.2 | 2.1 | 0.5 | ○ | ○ | — | — |
| Ex. 9 | 23 | 5.2 | 1.2 | 0.0 | ○ | ○ | — | — |
| Ex. 10 | 95 | 3.3 | 0.6 | 0.0 | ⊚ | — | ○ | ○ |
| Ex. 11 | 128 | 2.3 | 0.7 | 0.0 | ⊚ | — | ○ | ○ |
| Ex. 12 | 135 | 2.1 | 0.7 | 0.0 | ⊚ | — | ○ | ○ |
| Comp. Ex. 1 | 9 | 9.1 | 0.5 | 1.1 | X | X | — | — |
| Comp. Ex. 2 | 13 | 11 | 0.3 | 0.9 | X | X | — | — |
| Comp. Ex. 3 | 70 | 5.5 | 2.1 | 1.1 | X | X | — | — |
| Comp. Ex. 4 | 1540 | 7.5 | 0.06 | 0.0 | X | X | — | — |
| Comp. Ex. 5 | 399 | 3.8 | 0.01 | 0.0 | X | X | — | — |
| Comp. Ex. 6 | 1225 | 63 | 1.7 | 0.0 | X | X | — | — |
| Comp. Ex. 7 | 69 | 593 | 22 | 0.0 | X | X | — | — |
| Comp. Ex. 8 | 10 | 9.3 | 0.6 | 0.8 | X | — | X | X |
| Comp. Ex. 9 | 15 | 12 | 0.4 | 1.0 | X | — | X | X |

Example 13

1. Preparation of a Surface-Treated Metal Plate

As a metal plate, a cold-rolled steel plate having a thickness of 0.22 mm and a tempering degree of DR8 was pre-treated such as electrolytically dewaxed, washed with acid, washed with water, and washed with pure water. Then, the cathodic electrolysis was conducted in the treatment bath represented by A in Table 1 in the same manner as in Example 1 but selecting the current density to be 2.4 A/dm$^2$ to obtain a surface-treated metal plate.

2. Preparation of a Resin-Coated Metal Plate

The obtained surface-treated metal plate was heated at 250° C. in advance, and the lower side of the cast film represented by b in Table 3 was thermally press-adhered onto one surface that becomes the inner surface and the cast film represented by d in Table 3 was thermally press-adhered onto the other surface thereof that becomes the outer surface thereof, by using laminate rolls, immediately followed by cooling with water to obtain a resin-coated metal plate.

3. Preparation of a Can Barrel and a Can Lid

A lubricant for working was applied onto the obtained resin-coated metal plate which was, then, re-drawn (drawing ratio of 2.5) to obtain a can barrel having an inner diameter of 65.3 mm. Then, the can barrel was heat-treated at 220° C. for 60 seconds to remove distortion from the resin film followed by trimming at the open end and flanging to obtain a deep-drawn can having a height of 101.1 mm. By using part of the obtained resin-coated metal plate, further, a full-open lid having a diameter of 211 was prepared by a predetermined method.

4. Content-Filling Test

By using the thus formed can barrel and can lid, the can barrel was filled with a meat sauce. The full-open lid was, then, double wrap-seamed to effect the retort sterilization treatment at 120° C. for 30 minutes.

5. Evaluation of the Surface-Treated Metal Plate

Part of the thus obtained surface-treated metal plate was measured for its Zr film thickness and surface atomic ratio in the same manner as in Example 1. The results were as shown in Table 5.

6. Evaluation of the Container

After the container was formed, the organic film was examined to observe whether there were peeling or perforation. After the content was filled, further, the container was preserved at 37° C. for 6 months and was opened to examine the corrosion on the inner surface of the container and the floating of the organic film. The results were as shown in Table 5.

Example 14

1. Preparation of a Surface-Treated Metal Plate

As a metal plate, a cold-rolled steel plate having a thickness of 0.17 mm and a tempering degree of DR8 was pre-treated such as electrolytically dewaxed, washed with acid, washed with water, washed with pure water and was then plated with nickel in an amount of 0.3 g/m$^2$ per one surface and with tin in an amount of 0.6 g/m$^2$ per one surface, followed by a reflow treatment to form an alloy layer of nickel-tin-iron. Then, the cathodic electrolysis was conducted in the treatment bath represented by A in Table 1 in the same manner as in Example 13 to obtain a surface-treated metal plate.

2. Preparation of a Resin-Coated Metal Plate

The obtained surface-treated metal plate was roll-coated on both surfaces thereof with an aqueous coating material of the epoxy acryl type such that the film thickness after the baking was 10 μm, and was subjected to the baking treatment at 200° C. for 10 minutes to obtain a resin-coated metal plate.

3. Preparation of a Can Barrel and a Can Lid

A lubricant for working was applied onto the obtained resin-coated metal plate which was, then, drawn (drawing ratio of 1.3) to obtain a can barrel having an inner diameter of 83.3 mm. Then, the open end was trimmed and flanged to obtain a drawn can having a height of 45.5 mm. By using part of the obtained resin-coated metal plate, further, a full-open lid having a diameter of 307 was prepared by a customary method.

4. Content-Filling Test

By using the thus formed can barrel and can lid, the can barrel was filled with tuna in oil. The full-open lid was, then, double wrap-seamed to effect the retort sterilization treatment at 115° C. for 60 minutes.

5. Evaluation of the Surface-Treated Metal Plate

The surface-treated metal plate was measured for its Zr film thickness and surface atomic ratio in the same manner as in Example 13.

6. Evaluation of the Container

The container was evaluated in the same manner as in Example 13 and, besides, the discoloration due to vulcanization was examined after the can was opened.

Example 15

1. Preparation of a Surface-Treated Metal Plate

As a metal plate, a cold-rolled steel plate having a thickness of 0.22 mm and a tempering degree of T4 was pre-treated such as electrolytically dewaxed, washed with acid, washed with water, washed with pure water and was, then, plated with tin in an amount of 2.0 g/m$^2$ per one surface, followed by a reflow treatment. Thereafter, the cathodic electrolytic treatment was conducted in the treatment bath represented by A in Table 1 in the same manner as in Example 13 but selecting the current density to be 1.0 A/dm$^2$ to obtain a surface-treated metal plate for can barrel.

Another cold-rolled steel plate having a thickness of 0.21 mm and a tempering degree of T4, too, was treated in the same manner as described above to obtain a surface-treated metal plate for can lid.

2. Preparation of a Resin-Coated Metal Plate, a Can Barrel and a Can Lid

The surface-treated metal plate for can barrel was margin-coated with an aqueous coating material of the epoxy acryl type except a portion that becomes the seam of the can barrel in a manner that the film thickness after the baking was 5 μm on the inner surface and was 3 μm on the outer surface. The surface-treated metal plate was then cured by baking in a hot-air drying furnace heated at 200° C. for 10 minutes to obtain a resin-coated metal plate.

The thus obtained resin-coated metal plate was cut into a blank which was welded into a cylindrical shape by using a commercially available electric resistance welding machine using a wire electrode. Next, the inner surface and the outer surface of the welded seam of the can barrel was spray-coated with a solvent-type epoxy urea repairing coating material such that the thickness of the film after drying was 40 μm. Thereafter, the resin-coated metal plate was baked in a hot-air drying furnace heated at 250° C. for 3 minutes, and the seam portion was coated to obtain a welded can barrel (can diameter of 65.4 mm and can barrel height of 122 mm).

Both surfaces of the surface-treated metal plate for can lid was roll-coated with an aqueous coating material of the epoxy acryl type in a manner that the thickness of the film after the baking was 10 μm, followed by a baking treatment at 200° C. for 10 minutes to prepare a shell lid of a diameter of 209 according to a customary method.

One open end of the can barrel was flanged and necked to wrap seam the lid of the diameter of 209, and another open end was triple-necked and flanged.

3. Content-Filling Test

After filled with a coffee beverage at 50° C., a commercially available aluminum SOT lid having a diameter of 206 was double-wrap-seamed, and the retort sterilization treatment was effected at 125° C. for 25 minutes.

4. Evaluation of the Surface-Treated Metal Plate

The surface-treated metal plate was measured for its Zr film thickness and surface atomic ratio in the same manner as in Example 13.

5. Evaluation of the Container

The container was evaluated in the same manner as in Example 13 and, besides, the amount of iron eluted out was measured after the can was opened.

Example 16

1. Preparation of a Surface-Treated Metal Plate

As a metal plate, a cold-rolled steel plate having a thickness of 0.22 mm and a tempering degree of T4 was pre-treated such as electrolytically dewaxed, washed with acid, washed with water, washed with pure water and was, then, plated with nickel in an amount of 0.03 g/m$^2$ per one surface and with tin in an amount of 1.3 g/m$^2$ per one surface, followed by a reflow treatment. Thereafter, the cathodic electrolytic treatment was conducted in the treatment bath represented by A in Table 1 in the same manner as in Example 15 to obtain a surface-treated metal plate for can barrel.

Another cold-rolled steel plate having a thickness of 0.21 mm and a tempering degree of T4, too, was treated in the same manner as described above to obtain a surface-treated metal plate for can lid.

2. Preparation of a Resin-Coated Metal Plate, a Can Barrel and a Can Lid

The surface-treated metal plate for can barrel was margin-coated with a solvent type coating material of epoxy phenol except a portion that becomes the seam of the can barrel in a manner that the film thickness after the baking was 5 μm on the inner surface and was 3 μm on the outer surface. The surface-treated metal plate was then cured by baking in a hot-air drying furnace heated at 200° C. for 10 minutes to obtain a resin-coated metal plate.

The thus obtained resin-coated metal plate was cut into a blank which was welded into a cylindrical shape by using a commercially available electric resistance welding machine using a wire electrode. Next, the inner surface and the outer surface of the welded seam of the can barrel was spray-coated with a solvent-type epoxy urea repairing coating material such that the thickness of the film after drying was 40 μm. Thereafter, the resin-coated metal plate was baked in a hot-air drying furnace heated at 250° C. for 3 minutes, and the seam portion was coated to obtain a welded can barrel (can diameter of 65.4 mm and can barrel height of 122 mm).

Both surfaces of the surface-treated metal plate for can lid was roll-coated with a solvent type coating material of epoxy phenol in a manner that the thickness of the film after the baking was 10 μm, followed by a baking treatment at 200° C. for 10 minutes to prepare a shell lid of a diameter of 209 according to a customary method.

One open end of the can barrel was flanged and necked to wrap seam the lid of the diameter of 209, and another open end was triple-necked and flanged.

3. Content-Filling Test

After hot-packed with an orange juice at 93° C., an aluminum SOT lid having a diameter of 206 was double-wrap-seamed.

4. Evaluation of the Surface-Treated Metal Plate

The surface-treated metal plate was measured for its Zr film thickness and surface atomic ratio in the same manner as in Example 13.

5. Evaluation of the Container

The container was evaluated in the same manner as in Example 15.

Example 17

1. Preparation of a Surface-Treated Metal Plate

As a metal plate, a cold-rolled steel plate having a thickness of 0.195 mm and a tempering degree of T3 was pre-treated such as electrolytically dewaxed, washed with acid, washed with water, washed with pure water and was, then, plated with tin in an amount of 1.0 g/m² per one surface, followed by the cathodic electrolysis in the treatment bath represented by A in Table 1 in the same manner as in Example 15 to obtain a surface-treated metal plate for can barrel.

As another metal plate, an aluminum alloy plate JIS 5182H19 having a thickness of 0.285 mm was pre-treated and cathodically electrolyzed in the same manner as in Example 1 to obtain a surface-treated metal plate for can lid.

2. Preparation of a Resin-Coated Metal Plate

The obtained surface-treated metal plate for can barrel and can lid was heated at 250° C. in advance, and the lower side of the cast film represented by e in Table 3 was thermally press-adhered onto one surface and the cast film represented by d in Table 3 was thermally press-adhered onto the other surface thereof that becomes the outer surface thereof, by using laminate rolls, immediately followed by cooling with water to obtain a resin-coated metal plate.

3. Preparation of a Can Barrel and a Can Lid

A paraffin wax was electrostatically applied onto both surfaces of the resin-coated metal plate for can barrel which was, then, punched into a circle of a diameter of 140 mm to obtain a shallow-draw-formed cup according to a customary method. Then, the thus draw-formed cup was subjected to the redraw/ironing working two times repetitively to obtain a draw-ironed cup having a small diameter but a large height. The thus obtained cup exhibited the following properties.

Cup diameter: 52 mm
Cup height: 138 mm
Thickness of can wall relative to the initial
plate thickness: −50%

After doming, the cup was heat-treated at 220° C. for 60 seconds to remove distortion from the resin film followed by trimming at the open end, printing on the curved surface, necking into a diameter of 200 and flanging to obtain a 250-g seamless can.

Further, an SOT lid of a diameter of 200 was prepared from the resin-coated metal plate for can lid according to a customary method.

4. Content-Filling Test

The above 250-g can was cold-packed with a cola at 5° C., and the SOT lid was readily double wrap-seamed.

5. Evaluation of the Surface-Treated Metal Plate

The surface-treated metal plate was measured for its Zr film thickness and surface atomic ratio in the same manner as in Example 13.

6. Evaluation of the Container

The container was evaluated in the same manner as in Example 15.

Example 18

1. Preparation of a Surface-Treated Metal Plate and a Resin-Coated Metal Plate The pre-treatment was conducted, the surface was treated and the resin was coated in the same manner as in Example 1 but using, as a metal plate for can barrel, an aluminum alloy plate JIS 3004H19 having a thickness of 0.28 mm and, as a metal plate for can lid, an aluminum alloy plate JIS 5182H19 having a thickness of 0.25 mm, and coating both surfaces thereof with the cast film a of Table 3.

A paraffin wax was electrostatically applied onto both surfaces of the obtained resin-coated metal plate for can barrel which was, then, punched into a circle of a diameter of 166 mm to obtain a shallow-draw-formed cup according to a customary method. Then, the thus draw-formed cup was subjected to the redraw/ironing working to obtain a draw-ironed can. The thus obtained can exhibited the following properties.

Can diameter: 66 mm
Can height: 128 mm
Thickness of can wall relative to the initial
plate thickness: −63%

The can was domed according to a customary method and was heat-treated at 220° C. for 60 seconds to remove distortion from the resin film followed by trimming at the open end, printing on the curved surface, necking into a diameter of 206 and flanging to obtain a 350-g seamless can.

Further, an SOT lid of a diameter of 206 was prepared from the resin-coated metal plate for can lid according to a customary method.

2. Content-Filling Test

The above 350-g can was cold-packed with a beer at 5° C., and the SOT lid was readily double wrap-seamed.

3. Evaluation of the Surface-Treated Metal Plate

The surface-treated metal plate was measured for its Zr film thickness and surface atomic ratio in the same manner as in Example 13.

4. Evaluation of the Container

The container was evaluated in the same manner as in Example 13 and, besides, the eluting amount of aluminum was measured after the can was opened.

TABLE 5

| | | Surface-treated metal plate | | | | Container performance | | | |
|---|---|---|---|---|---|---|---|---|---|
| | | Zr | | | | Container | Resistance against content | | |
| | | gravimetric | | | | formability | Inner surface of container | | |
| | | film thickness | Surface atomic ratio | | | State of organic | | Discoloration of | Metal elution |
| | Use | (mg/m²) | O/Zr | F/Zr | P/Zr | film | Corrosion | Organic film | inner surface | (ppm) |
| Ex. 13 | for barrel, lid | 78 | 1.6 | 1.1 | 0.0 | normal | normal | normal | — | — |
| Ex. 14 | for barrel, lid | 70 | 1.4 | 1.0 | 0.0 | normal | normal | normal | normal | — |
| Ex. 15 | for barrel | 32 | 2.9 | 1.0 | 0.0 | normal | normal | normal | — | 0.00 |
| | for lid | 28 | 3.2 | 1.1 | 0.0 | | | | | |
| Ex. 16 | for barrel | 35 | 3.3 | 0.9 | 0.0 | normal | normal | normal | — | 0.15 |
| | for lid | 33 | 3.2 | 1.0 | 0.0 | | | | | |
| Ex. 17 | for barrel | 28 | 2.9 | 1.2 | 0.0 | normal | normal | normal | — | 0.05 |
| | for lid | 82 | 2.6 | 1.3 | 0.0 | | | | | |
| Ex. 18 | for barrel | 86 | 3.0 | 1.3 | 0.0 | normal | normal | normal | — | 0.00 |
| | for lid | 80 | 2.9 | 1.3 | 0.0 | | | | | |

The invention claimed is:

1. A surface-treated seamless steel can comprising a surface-treated steel sheet, having:
   an inorganic surface-treating layer on the surface of the steel sheet; and
   a thermoplastic polyester resin coating formed on at least one surface of said inorganic surface-treating layer;
   wherein said inorganic surface-treating layer comprises Zr, O, F and H, contains P and Zr in the uppermost surface of the inorganic surface-treating layer at an atomic ratio of $0 \leq P/Zr<0.1$, contains O and Zr in the uppermost surface of the inorganic surface-treating layer at an atomic ratio of $1<O/Zr<5$, contains F and Zr in the uppermost surface of the inorganic surface-treating layer at an atomic ratio of $0.5<F/Zr<2.0$, and the coating weight of Zr of the inorganic surface-treating layer being 5 to 100 mg/m².

2. A surface-treated seamless steel can according to claim 1, wherein fine particles containing Zr of 10 to 100 nm are present in at least a portion of the inorganic surface-treating layer.

3. A method of making a surface-treated seamless steel can comprising a surface-treated steel sheet, having:
   an inorganic surface-treating layer on the surface of the steel sheet; and
   a thermoplastic polyester resin coating formed on at least one surface of said inorganic surface-treating layer;
   wherein said inorganic surface-treating layer comprises Zr, O, F and H, contains P and Zr in the uppermost surface of the inorganic surface-treating layer at an atomic ratio of $0 \leq P/Zr<0.1$, contains O and Zr in the uppermost surface of the inorganic surface-treating layer at an atomic ratio of $1<O/Zr<5$, contains F and Zr in the uppermost surface of the inorganic surface-treating layer at an atomic ratio of $0.5<F/Zr<2.0$, and the coating weight of Zr of the inorganic surface-treating layer being 5 to 100 mg/m²,
   said method comprises forming an inorganic surface-treating layer on the surfaces of a steel sheet by cathodic electrolytic treatment in an aqueous solution containing Zr and F and having a phosphoric acid ion concentration of smaller than 0.003 mol/liter calculated as $PO_4$, and coating a thermoplastic polyester resin onto at least a part of said inorganic surface-treating layer.

4. A method of making a surface-treated seamless steel can according to claim 3, wherein the cathodic electrolytic treatment is intermittently conducted.

5. A method of making a surface-treated seamless steel can according to claim 3, wherein the bath concentration contains Zr at a concentration in a range of 0.010 to 0.050 mol/liter, and contains F at a concentration in a range of 0.03 to 0.35 mol/liter.

6. A surface-treated seamless steel can according to claim 1, wherein the inorganic surface-treating layer is formed by a cathodic electrolytic method.

7. A surface-treated seamless steel can according to claim 1, prepared by draw-ironing a thermoplastic polyester resin-coated steel sheet having thereon the inorganic surface-treating layer.

* * * * *